(12) United States Patent
Jaugilas

(10) Patent No.: US 10,919,626 B2
(45) Date of Patent: Feb. 16, 2021

(54) CHARGING A RECHARGEABLE BATTERY OF AN UNMANNED AERIAL VEHICLE IN FLIGHT USING A HIGH VOLTAGE POWER LINE

(71) Applicant: The Boeing Company, Chicago, IL (US)

(72) Inventor: John Jaugilas, Englewood, CO (US)

(73) Assignee: The Boeing Company, Chicago, IL (US)

( * ) Notice: Subject to any disclaimer, the term of this patent is extended or adjusted under 35 U.S.C. 154(b) by 108 days.

(21) Appl. No.: 16/193,178

(22) Filed: Nov. 16, 2018

(65) Prior Publication Data
US 2019/0144112 A1 May 16, 2019

Related U.S. Application Data

(63) Continuation-in-part of application No. 15/815,689, filed on Nov. 16, 2017.

(51) Int. Cl.
| | | |
|---|---|---|
| B64C 39/02 | (2006.01) |
| H02G 1/02 | (2006.01) |
| H02J 7/02 | (2016.01) |
| B60L 5/00 | (2006.01) |
| B60L 53/12 | (2019.01) |
| H02J 50/10 | (2016.01) |
| G05D 1/10 | (2006.01) |

(Continued)

(52) U.S. Cl.
CPC ............ *B64C 39/024* (2013.01); *B60L 5/005* (2013.01); *B60L 53/12* (2019.02); *H02G 1/02* (2013.01); *H02J 7/025* (2013.01); *H02J 50/10* (2016.02); *B64C 2201/042* (2013.01); *B64C 2201/066* (2013.01); *B64C 2201/127* (2013.01); *B64C 2201/146* (2013.01); *B64D 47/08* (2013.01); *G05D 1/0094* (2013.01); *G05D 1/101* (2013.01)

(58) Field of Classification Search
CPC ........................ B64C 2201/066; B64C 39/024
See application file for complete search history.

(56) References Cited

U.S. PATENT DOCUMENTS

| | | |
|---|---|---|
| 4,737,788 A | 4/1988 | Kennedy |
| 7,318,564 B1 | 1/2008 | Marshall |
| (Continued) | | |

FOREIGN PATENT DOCUMENTS

WO    WO2016103264 A1    6/2016

OTHER PUBLICATIONS

European Patent Office Communication and Search Report, dated Apr. 11, 2019, regarding Application No. 18206715.7, 13 pages.

(Continued)

*Primary Examiner* — David V Henze-Gongola
*Assistant Examiner* — Tarikh Kanem Rankine
(74) *Attorney, Agent, or Firm* — Yee & Associates, P.C.

(57) ABSTRACT

Methods and an apparatus are presented. A method of monitoring utilities is presented. A rechargeable battery of an unmanned aerial vehicle is charged using an electromagnetic field of a high voltage power line within a right-of-way and a recharging system of the unmanned aerial vehicle. The unmanned aerial vehicle is flown a specified distance from the high voltage power line during the charging. Utilities are inspected using a sensor of the unmanned aerial vehicle while flying the unmanned aerial vehicle the specified distance from the high voltage power line.

12 Claims, 11 Drawing Sheets

(51) Int. Cl.
*G05D 1/00* (2006.01)
*B64D 47/08* (2006.01)

(56) References Cited

U.S. PATENT DOCUMENTS

| | | | |
|---|---|---|---|
| 7,398,946 B1 | 7/2008 | Marshall | |
| 7,543,780 B1 | 6/2009 | Marshall et al. | |
| 7,714,536 B1 | 5/2010 | Silberg et al. | |
| 8,082,102 B2 | 12/2011 | Ravenscroft | |
| 9,162,753 B1* | 10/2015 | Panto | B64C 19/00 |
| 9,376,208 B1* | 6/2016 | Gentry | B64C 39/024 |
| 9,421,869 B1* | 8/2016 | Ananthanarayanan | B60L 53/38 |
| 2006/0091310 A1* | 5/2006 | Furry | G01N 21/3518 250/330 |
| 2010/0268409 A1* | 10/2010 | Vian | G05D 1/104 701/24 |
| 2011/0313652 A1* | 12/2011 | Hancock | B60L 3/12 701/527 |
| 2015/0226559 A1 | 8/2015 | Waite et al. | |
| 2015/0377405 A1* | 12/2015 | Down | B64C 39/024 73/865.8 |
| 2016/0169855 A1* | 6/2016 | Baity | G01N 33/24 47/58.1 SC |
| 2016/0214714 A1* | 7/2016 | Sekelsky | B60L 53/126 |
| 2016/0214715 A1 | 7/2016 | Meffert | |
| 2016/0307447 A1* | 10/2016 | Johnson | B60L 58/12 |
| 2016/0364989 A1* | 12/2016 | Speasl | B64F 1/222 |
| 2017/0015414 A1 | 1/2017 | Chan et al. | |
| 2017/0097435 A1* | 4/2017 | Hull | G01V 3/08 |
| 2017/0174090 A1 | 6/2017 | Lakamp et al. | |
| 2017/0271926 A1 | 9/2017 | Plekhanov et al. | |
| 2018/0095468 A1* | 4/2018 | Yang | B60L 53/12 |
| 2018/0144644 A1* | 5/2018 | Heinonen | G01S 19/13 |
| 2018/0166920 A1 | 6/2018 | Britz et al. | |
| 2018/0201370 A1 | 7/2018 | Yang et al. | |
| 2019/0077505 A1* | 3/2019 | Akens | H02J 7/0042 |

OTHER PUBLICATIONS

European Patent Office Communication, dated Aug. 9, 2019, regarding Application No. 18206715.7, 12 pages.
The Netherlands Patent Office Written Opinion, Search Report, and English translation, dated Aug. 2, 2018, regarding Application No. NL2020097, 10 pages.
European Patent Office Communication, dated Jul. 17, 2020, regarding Application No. 18206715.7, 5 pages.
Lu et al., "Unmanned Aerial Vehicle (UAV) Charging from Powerlines;" IEEE PES Asia-Pacific Power and Energy Engineering Conference (APPEEC); Nov. 8, 2017; 6 pgs.
Office Action, dated Apr. 14, 2020, regarding U.S. Appl. No. 15/815,689, 26 pages.

* cited by examiner

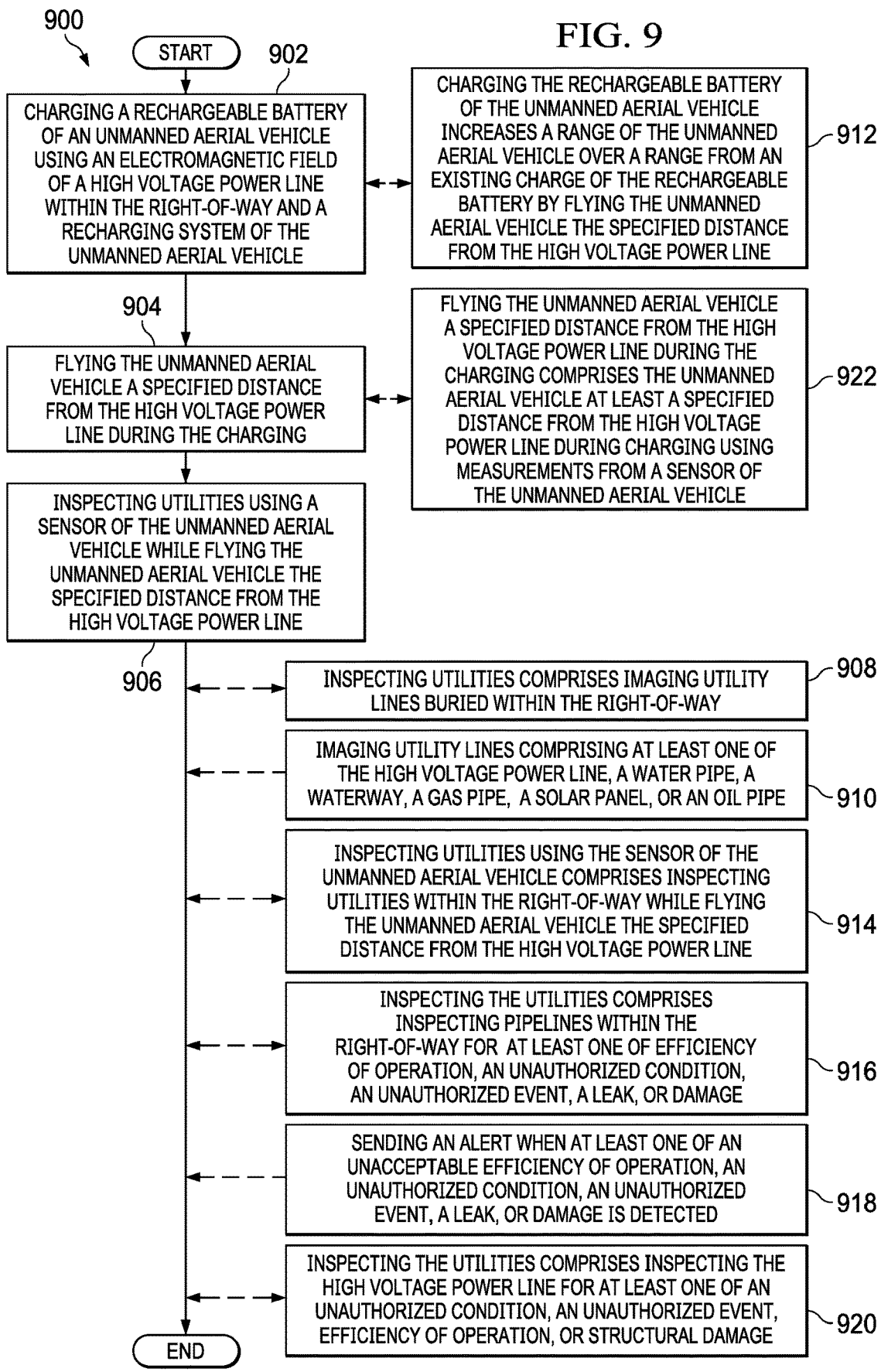

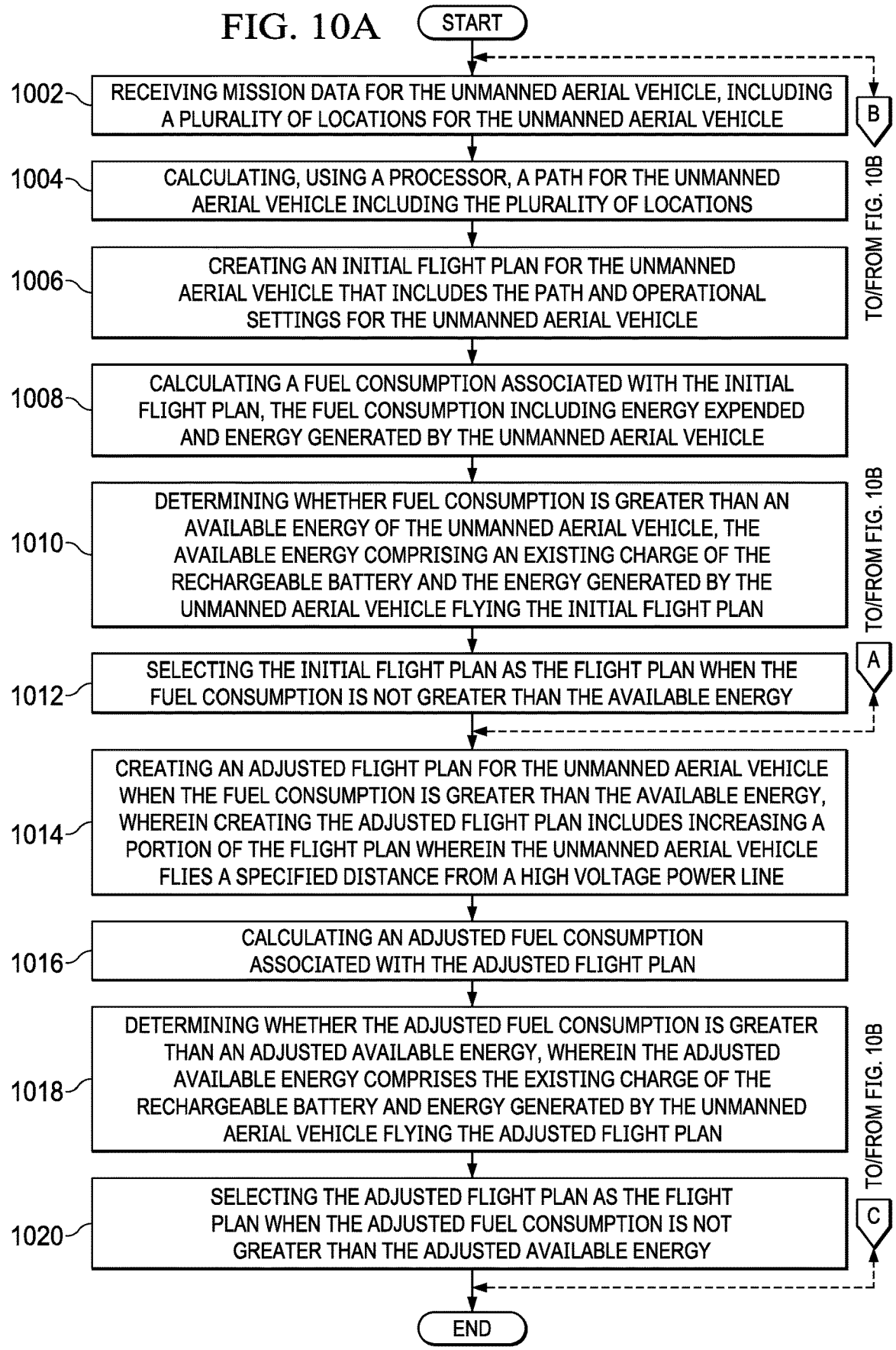

CHARGING A RECHARGEABLE BATTERY OF AN UNMANNED AERIAL VEHICLE IN FLIGHT USING A HIGH VOLTAGE POWER LINE

CROSS-REFERENCE TO RELATED APPLICATION(S)

This application is a continuation-in-part of prior co-pending U.S. patent application Ser. No. 15/815,689 filed Nov. 16, 2017, the entire disclosure of which is incorporated by reference herein.

BACKGROUND INFORMATION

1. Field

The present disclosure relates generally to flying an unmanned aerial vehicle and, more specifically, to charging a rechargeable battery of an unmanned aerial vehicle in-flight.

2. Background

Batteries are used to power unmanned aerial vehicles. Flight times and flight distances for unmanned aerial vehicles are affected by battery life. Increasing battery capacity increases available power, but also increases the weight of the unmanned aerial vehicle.

Therefore, it would be desirable to have a method and apparatus that take into account at least some of the issues discussed above, as well as other possible issues.

SUMMARY

An illustrative embodiment of the present disclosure provides a method of monitoring utilities. A rechargeable battery of an unmanned aerial vehicle is charged using an electromagnetic field of a high voltage power line within a right-of-way and a recharging system of the unmanned aerial vehicle. The unmanned aerial vehicle is flown a specified distance from the high voltage power line during the charging. Utilities are inspected using a sensor of the unmanned aerial vehicle while flying the unmanned aerial vehicle the specified distance from the high voltage power line.

An illustrative embodiment of the present disclosure provides a method of generating a flight plan for an unmanned aerial vehicle including charging a rechargeable battery of the unmanned aerial vehicle. Mission data for the unmanned aerial vehicle, including a plurality of locations for the unmanned aerial vehicle, is received. A path for the unmanned aerial vehicle including the plurality of locations is calculated using a processor. An initial flight plan is created for the unmanned aerial vehicle that includes the path and operational settings for the unmanned aerial vehicle. A fuel consumption associated with the initial flight plan is calculated, the fuel consumption including energy expended and energy generated by the unmanned aerial vehicle. It is determined whether fuel consumption is greater than an available energy of the unmanned aerial vehicle, the available energy comprising an existing charge of the rechargeable battery and the energy generated by the unmanned aerial vehicle flying the initial flight plan. The initial flight plan is selected as the flight plan when the fuel consumption is not greater than the available energy. An adjusted flight plan is created for the unmanned aerial vehicle when the fuel consumption is greater than the available energy, wherein creating the adjusted flight plan includes increasing a portion of the flight plan wherein the unmanned aerial vehicle flies a specified distance from a high voltage power line. An adjusted fuel consumption associated with the adjusted flight plan is calculated. It is determined whether the adjusted fuel consumption is greater than an adjusted available energy, wherein the adjusted available energy comprises the existing charge of the rechargeable battery and energy generated by the unmanned aerial vehicle flying the adjusted flight plan. The adjusted flight plan is selected as the flight plan when the adjusted fuel consumption is not greater than the adjusted available energy.

An illustrative embodiment of the present disclosure provides an apparatus for generating a flight plan for an unmanned aerial vehicle, the apparatus comprises a flight plan generator. The flight plan generator is configured to receive mission data for the unmanned aerial vehicle, including a plurality of locations for the unmanned aerial vehicle; calculate a path for the unmanned aerial vehicle including the plurality of locations; create an initial flight plan for the unmanned aerial vehicle that includes the path and operational settings for the unmanned aerial vehicle; calculate a fuel consumption associated with the initial flight plan, the fuel consumption including energy expended and energy generated by the unmanned aerial vehicle; determine whether fuel consumption is greater than an available energy of the unmanned aerial vehicle, the available energy comprising an existing charge of the rechargeable battery and the energy generated by the unmanned aerial vehicle flying the initial flight plan; and selecting the initial flight plan as the flight plan when the fuel consumption is not greater than the available energy; create an adjusted flight plan for the unmanned aerial vehicle when the fuel consumption is greater than the available energy, wherein creating the adjusted flight plan includes increasing a portion of the flight plan wherein the unmanned aerial vehicle flies a specified distance from a high voltage power line; calculate an adjusted fuel consumption associated with the adjusted flight plan; determine whether the adjusted fuel consumption is greater than an adjusted available energy, wherein the adjusted available energy comprises the existing charge of the rechargeable battery and energy generated by the unmanned aerial vehicle flying the adjusted flight plan; and select the adjusted flight plan as the flight plan when the adjusted fuel consumption is not greater than the adjusted available energy.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 9 is an illustration of a flowchart of a method of monitoring utilities in accordance with an illustrative embodiment; and FIGS. 10A and 10B are an illustration of a flowchart of a method of generating a flight plan for an unmanned aerial vehicle including charging a rechargeable battery of the unmanned aerial vehicle in accordance with an illustrative embodiment.

DETAILED DESCRIPTION

Figure 1:
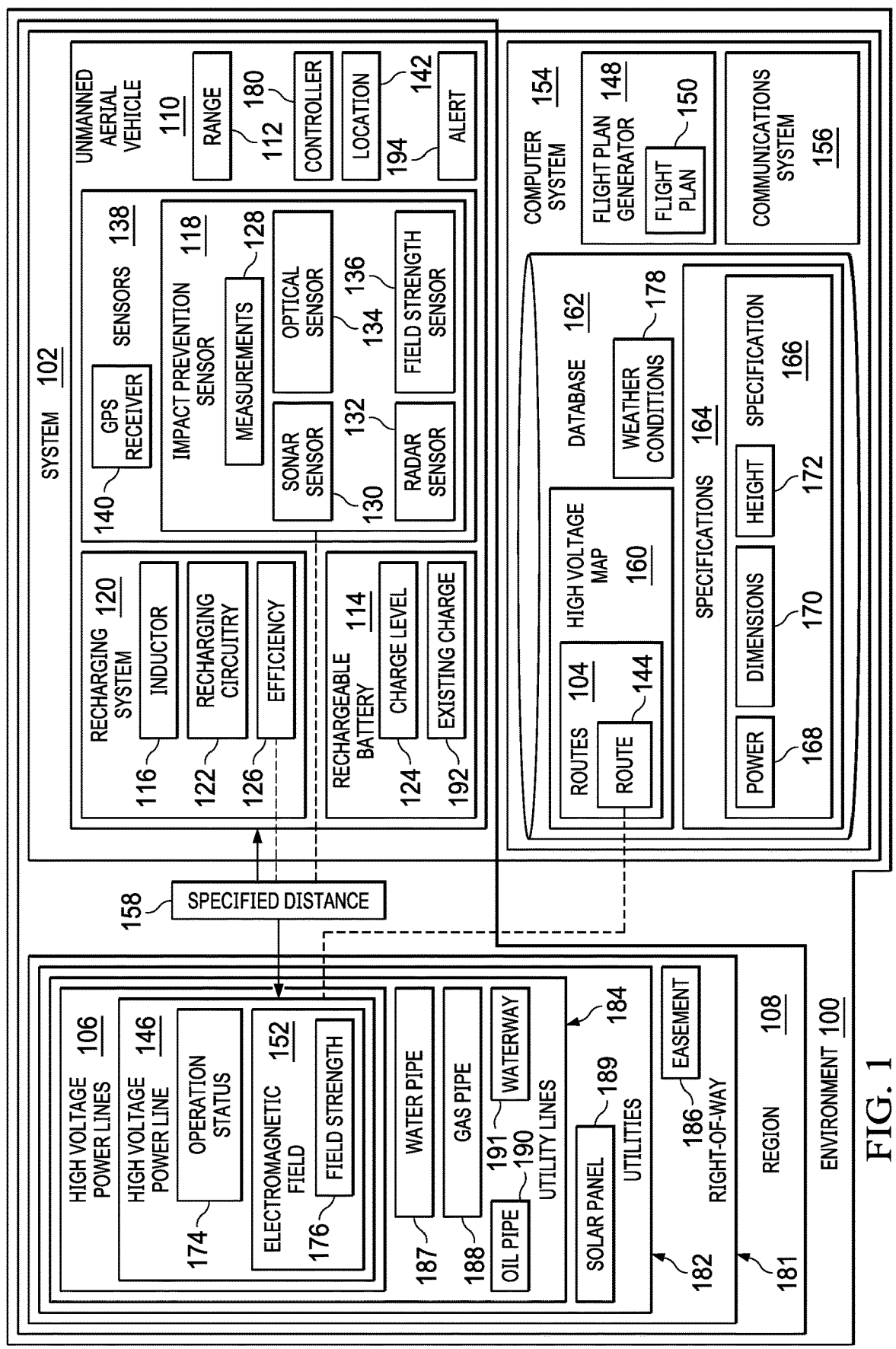
FIG. 1 is an illustration of a block diagram of an environment in which an aerial vehicle flies using a flight plan taking into account a route of a high voltage power line in accordance with an illustrative embodiment.

The illustrative embodiments recognize and take into account one or more different considerations. For example, the illustrative embodiments recognize and take into account that unmanned aerial vehicles are advantageous in several scenarios. The illustrative embodiments recognize and take into account that unmanned aerial vehicles can be used for delivery of packages by a store or vendor. The illustrative embodiments recognize and take into account that unmanned aerial vehicles can be used for delivery of fast food orders. The illustrative embodiments recognize and take into account that unmanned aerial vehicles can be used for transport of human or animal passengers. The illustrative embodiments recognize and take into account that unmanned aerial vehicles can be used for inspection and monitoring of utilities such as pipelines. The illustrative embodiments recognize and take into account that unmanned aerial vehicles can be used for surveillance and/or reconnaissance.

The illustrative embodiments recognize and take into account that unmanned aerial vehicles are often powered with electric motors. The illustrative embodiments recognize and take into account that unmanned aerial vehicles with electric motors also have rechargeable batteries.

The illustrative embodiments recognize and take into account that charging during flight may reduce charging time on the ground. The illustrative embodiments recognize and take into account that reducing charging time on the ground increases the time an unmanned aerial vehicle may be in flight. The illustrative embodiments further recognize and take into account that charging during flight may result in increasing a range of an unmanned aerial vehicle. Increasing the range of an unmanned aerial vehicle may increase at least one of the number of areas that may be serviced by the unmanned aerial vehicle, or the time an unmanned aerial vehicle may be used.

The illustrative embodiments recognize and take into account that high voltage power lines emit an Electro Magnetic Field (EMF). The illustrative embodiments further recognize and take into account that for high voltage power lines, the EMF is so strong that flying some types of model aircraft near high voltage lines is prohibited. The illustrative embodiments recognize and take into account that passing an inductor, such as a coil or a wire, through an EMF generates electrical voltage and current.

The illustrative embodiments recognize and take into account that because general and commercial aviation flights keep away from power lines, recharging using high voltage power lines avoids flying in airspace normally used by airplanes and ultralight vehicles.

The illustrative embodiments recognize and take into account that unmanned aerial vehicles (UAVs) may fly along utility lines to check for damage or sabotage. The illustrative embodiments recognize and take into account that high voltage powerlines are positioned within right-of-ways. In some illustrative examples, right-of-ways may be referred to as easements, or areas designated for paths for utilities. The illustrative embodiments recognize and take into account that multiple types of utilities may be present in a right-of-way. For example, at least one of the high voltage power line, a water pipe, a waterway, a gas pipe, a solar panel, or an oil pipe may be present in the same right-of-way. Solar panels are positioned above ground to gather solar power. Other utilities, such as at least one of the high voltage power line, a water pipe, a waterway, a gas pipe, or an oil pipe may be at least one of above ground or buried. A waterway, such as a canal, a river, a ditch, a stream, creek, a bayou, or any other desirable type of waterway may be used to at least one of transport water or generate power. The illustrative embodiments recognize and take into account that often underground utilities or pipelines to be monitored are buried in the same easements as high voltage powerlines. The illustrative embodiments recognize and take into account that high voltage powerlines may either be buried within the same easement as or run above ground along the same path as other utilities.

An illustrative embodiment of the present disclosure provides a method. A rechargeable battery of an unmanned aerial vehicle is charged using an electromagnetic field of a high voltage power line and a recharging system of the unmanned aerial vehicle. The unmanned aerial vehicle is flown a specified distance from the high voltage power line during the charging.

Referring now to the figures and, in particular, with reference to FIG. 1, an illustration of a block diagram of an environment in which an aerial vehicle flies using a flight plan taking into account a route of a high voltage power line is depicted in accordance with an illustrative embodiment. Environment 100 contains system 102 for taking into account routes 104 of high voltage power lines 106 in region 108 when flying unmanned aerial vehicle 110 in region 108.

In some illustrative examples, system 102 increases range 112 of unmanned aerial vehicle 110. In these illustrative examples, system 102 takes into account routes 104 of high voltage power lines 106 to charge rechargeable battery 114 and increase range 112.

Unmanned aerial vehicle 110 comprises rechargeable battery 114, inductor 116 electrically connected to rechargeable battery 114, and impact prevention sensor 118.

Inductor 116 is part of recharging system 120 configured to recharge rechargeable battery 114. Recharging circuitry 122 of recharging system 120 electrically connects inductor 116 to rechargeable battery 114. Recharging circuitry 122 controls charging of rechargeable battery 114. In some illustrative examples, recharging circuitry 122 monitors charge level 124 of rechargeable battery 114. In some illustrative examples, recharging circuitry 122 controls charging of rechargeable battery 114 based on efficiency 126 of recharging.

Impact prevention sensor 118 monitors region 108 near unmanned aerial vehicle 110. Unmanned aerial vehicle 110 takes into account measurements 128 from impact prevention sensor 118, preventing unmanned aerial vehicle 110 from impacting objects, such as high voltage power lines 106. Unmanned aerial vehicle 110 may change at least one of altitude, flight direction, or speed to avoid obstacles based on measurements 128.

As used herein, the phrase "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, "at least one of item A, item B, or item C" may include, without limitation, item A, item A and item B, or item B. This example also may include item A, item B, and item C, or item B and item C. Of course, any combination of these items may be present. In other examples, "at least one of" may be, for example, without limitation, two of item A, one of item B, and ten of item C; four of item B and seven of item C; or other suitable combinations.

Impact prevention sensor 118 takes any desirable form. In some illustrative examples, impact prevention sensor 118 is one of SONAR sensor 130, RADAR sensor 132, optical sensor 134, or field strength sensor 136.

In some illustrative examples, impact prevention sensor 118 is one of sensors 138. Sensors 138 include any other desirable type of sensors. As depicted, sensors 138 includes GPS receiver 140. GPS receiver 140 is used to determine location 142 of unmanned aerial vehicle 110 within region 108.

System 102 uses high voltage power lines 106 of region 108 to charge rechargeable battery 114 of unmanned aerial vehicle 110. Unmanned aerial vehicle 110 recharges rechargeable battery 114 while in flight.

System 102 identifies route 144 of high voltage power line 146 through region 108. High voltage power line 146 is one of high voltage power lines 106 in region 108. Flight plan generator 148 creates flight plan 150 for unmanned aerial vehicle 110 such that unmanned aerial vehicle 110 charges rechargeable battery 114 of unmanned aerial vehicle 110 using electromagnetic field 152 of high voltage power line 146 for at least a portion of flight plan 150. Flight plan 150 also meets any objectives or destinations for unmanned aerial vehicle 110.

Computer system 154 communicates flight plan 150 to unmanned aerial vehicle 110 using communications system 156. In these illustrative examples, communications system 156 is configured to transmit flight plan 150 to unmanned aerial vehicle 110 from flight plan generator 148. Unmanned aerial vehicle 110 is flown according to flight plan 150 while maintaining unmanned aerial vehicle 110 at least specified distance 158 from high voltage power line 146 using measurements 128 from impact prevention sensor 118 of unmanned aerial vehicle 110. Unmanned aerial vehicle 110 is flown specified distance 158 from high voltage power line 146 during the charging. In some illustrative examples, flight plan 150 includes portions that do not charge rechargeable battery 114. In these "non-charging" portions, unmanned aerial vehicle 110 is flown greater than specified distance 158 from high voltage power line 146.

Specified distance 158 is a desired distance that unmanned aerial vehicle 110 will be flown from high voltage power lines 106 during charging. By flying unmanned aerial vehicle 110 specified distance 158 from high voltage power line 146, range 112 of unmanned aerial vehicle 110 is increased over a range from a single charge of rechargeable battery 114. As used herein, flying unmanned aerial vehicle 110 is performed when unmanned aerial vehicle 110 is airborne. Flying unmanned aerial vehicle 110 may include any of takeoffs, landings, hovering, changes in altitude, or movements in latitude or longitude.

Unmanned aerial vehicle 110 is maintained at least specified distance 158 from high voltage power line 146 using controller 180 and impact prevention sensor 118. Impact prevention sensor 118 provides measurements 128 from which the actual distance between high voltage power line 146 and unmanned aerial vehicle 110 is determined. In some illustrative examples, unmanned aerial vehicle 110 will maintain an approximately constant distance from high voltage power line 146. In other illustrative examples, unmanned aerial vehicle 110 will maintain an approximately constant altitude such that unmanned aerial vehicle 110 may have a variable distance from high voltage power line 146.

Specified distance 158 has any desirable value. In some examples, specified distance 158 includes a range of desirable values. In some illustrative examples, specified distance 158 is up to 200 meters. Specified distance 158 may be increased or decreased based upon specification 166 for high voltage power line 146. Specified distance 158 may be increased or decreased based on field strength 176 of electromagnetic field 152. In some illustrative examples, specified distance 158 is in the range of ten centimeters to 100 meters. In some illustrative examples, specified distance 158 is in the range of one meter to 50 meters.

Route 144 of high voltage power line 146 in region 108 is depicted in high voltage map 160. High voltage map 160 is present in database 162 of computer system 154. To create flight plan 150, flight plan generator 148 uses high voltage map 160.

In some illustrative examples, additional information regarding high voltage power lines 106 is stored in database 162. Specifications 164 for high voltage power lines 106 are optionally stored in database 162. Specifications 164 include any desirable characteristics of high voltage power lines 106.

Database 162 includes any desirable aeronautical information including at least one of weather or flight restricted areas.

As depicted, specification 166 of high voltage power line 146 includes power 168, dimensions 170, and height 172. Power 168 includes amperage or any other measurements for high voltage power line 146. Dimensions 170 include dimensions of the wires, platforms, and towers. Height 172 includes whether high voltage power line 146 is above ground or below ground and a distance high voltage power line 146 is above or below ground.

In some illustrative examples, unmanned aerial vehicle 110 is used to determine operation status 174 of high voltage power line 146. In some illustrative examples, field strength 176 of electromagnetic field 152 of high voltage power line 146 is detected with unmanned aerial vehicle 110 in-flight. In some illustrative examples, field strength 176 of electromagnetic field 152 is determined using field strength sensor 136. Operation status 174 of high voltage power line 146 is determined using field strength 176.

In some illustrative examples, to determine operation status 174, specification 166 of high voltage power line 146 is taken into account. A field strength, such as field strength 176, measured by field strength sensor 136, is dependent on at least one of specified distance 158, power 168 of high voltage power line 146, or other characteristics.

Unmanned aerial vehicle 110 flies relative to high voltage power line 146 using flight plan 150. Flight plan 150 may take into account any desirable properties such as weather conditions 178, a type of unmanned aerial vehicle 110, or capabilities of unmanned aerial vehicle 110. In some illustrative examples, weather conditions 178 are received from weather reports (not depicted). In some illustrative examples, a set value for specified distance 158 is part of flight plan 150.

Specified distance 158 may be selected based on any desirable characteristics. In some illustrative examples, specified distance 158 is selected based on weather conditions 178. For example, specified distance 158 is greater when weather conditions 178 include strong winds. Strong winds may push unmanned aerial vehicle 110 towards high voltage power line 146. Specified distance 158 is increased to compensate for strong winds. As another example, specified distance 158 may be greater when weather conditions 178 include thunderstorms. Thunderstorms may include static electricity and naturally occurring electromagnetic fields. Field strength sensor 136 may detect the naturally occurring electromagnetic fields in addition to electromagnetic field 152. Specified distance 158 may be increased to take into account the possible static electricity and naturally occurring electromagnetic fields of the thunderstorm.

In some illustrative examples, specified distance 158 is a maximum length from high voltage power line 146 while maintaining a pre-defined value for efficiency 126 of recharging system 120 of unmanned aerial vehicle 110. In some illustrative examples, the pre-defined value for efficiency 126 is a maximum efficiency under current conditions in regions 108. A maximum value for efficiency 126 is situationally and hardware dependent. For example, efficiency 126 is affected by field strength 176 of high voltage power line 146, an ambient temperature, and charging settings for rechargeable battery 114.

In some illustrative examples, specified distance 158 is selected to maintain a charge level of rechargeable battery 114. In some illustrative examples, specified distance 158 is selected based on field strength 176.

In some illustrative examples, specified distance 158 is part of flight plan 150 created by flight plan generator 148. In other illustrative examples, specified distance 158 is determined by controller 180 of unmanned aerial vehicle 110. Controller 180 is configured to fly unmanned aerial vehicle 110. In some illustrative examples, controller 180 is configured to fly the unmanned aerial vehicle 110 such that inductor 116 charges rechargeable battery 114 using electromagnetic field 152 of high voltage power line 146 while flying unmanned aerial vehicle 110 specified distance 158 from high voltage power line 146.

High voltage power line 146 is present in right-of-way 181. Right-of-way 181 is an area for routing utilities 182, including high voltage power line 146. Right-of-way 181 may also be referred to as easement 186. In some illustrative examples, utilities 182 within the right-of-way are inspected while flying unmanned aerial vehicle 110 specified distance 158 from high voltage power line 146.

Utilities 182 within right-of-way 181 include utility lines 184 that are at least one of above ground or buried within right-of-way 181. Utility lines 184 include at least one of high voltage power line 146, water pipe 187, waterway 191, gas pipe 188, solar panel 189, or oil pipe 190.

Although utilities 182 are depicted in right-of-way 181, utilities 182 outside of right-of-way 181 can be inspected by unmanned aerial vehicle 110 as well. For example, waterway 191 may extend outside of right-of-way 181. In some illustrative examples, unmanned aerial vehicle 110 inspects utilities 182 outside of right-of-way 181 while unmanned aerial vehicle 110 recharges using high voltage power line 146. In some illustrative examples, unmanned aerial vehicle 110 inspects waterway 191 outside of right-of-way 181 while recharging using high voltage power line 146. In other illustrative examples, unmanned aerial vehicle 110 recharges using high voltage power line 146 at least one of before or after inspecting utilities 182 outside of right-of-way 181. For example, unmanned aerial vehicle 110 recharges using high voltage power line 146 at least one of before or after inspecting waterway 191 outside of right-of-way 181.

Utilities 182 are inspected using any desirable type of sensor of sensors 138. Utilities 182 may be inspected using at least one of a proximity sensor, a magnetic field sensor, an IR camera, a visible spectrum camera, or any other desirable type of sensor. For example, high voltage power line 146 can be inspected using field strength sensor 136, optical sensor 134, sonar sensor 130, or radar sensor 132. Either of waterway 191 or solar panel 189 can be inspected using optical sensor 134. In some illustrative examples, at least one of water pipe 187, waterway 191, gas pipe 188, and or oil pipe 190 is inspected using optical sensor 134 or a heat sensor, such as an IR camera.

When the mission objective for unmanned aerial vehicle 110 is inspection of utilities 182 in right-of-way 181, flight plan 150 includes at least a portion along right-of-way 181. Flying along high voltage power line 146 increases charge level 124 of rechargeable battery 114. Prior to flying flight plan 150, rechargeable battery 114 has existing charge 192. Existing charge 192 is any charge level present in rechargeable battery 114. Existing charge 192 may be referred to as an "initial charge" when generating flight plan 150.

In some illustrative examples, unmanned aerial vehicle 110 inspects utilities 182 for at least one of efficiency of operation, an unauthorized condition, an unauthorized event, a leak, or damage. In some illustrative examples, when at least one of an unacceptable efficiency of operation, an unauthorized condition, an unauthorized event, a leak, or damage is detected alert 194 is sent. In some illustrative examples, unmanned aerial vehicle 110 sends alert 194. In other illustrative examples, computer system 154 sends alert 194.

Alert 194 includes any desirable content. In some illustrative examples, alert 194 includes a sensor output, such as an image, a sensor reading, or any other desirable type of output. In some illustrative examples, alert 194 takes the form of a report, a light, an indicator, or any other desirable type of alert. In some illustrative examples, alert 194 is configured to bring the unacceptable efficiency of operation, an unauthorized condition, an unauthorized event, a leak, or damage to the attention of a human operator.

The illustration of environment 100 in FIG. 1 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, more than one type of impact prevention sensor 118 may be present on unmanned aerial vehicle 110. In some illustrative examples, field strength sensor 136 as well as at least one of SONAR sensor 130, RADAR sensor 132, or optical sensor 134 are present on unmanned aerial vehicle 110. In some illustrative examples, recharging system 120 is used as a field strength sensor.

Although only unmanned aerial vehicle 110 is depicted in region 108, in other illustrative examples, additional unmanned aerial vehicles may operate within region 108. In some illustrative examples, another unmanned aerial vehicle may travel a set distance from high voltage power line 146. In these illustrative examples, impact prevention sensor 118 and a respective impact prevention sensor of the additional unmanned aerial vehicle prevent undesirable contact of unmanned aerial vehicle 110 and the additional unmanned aerial vehicle.

In some illustrative examples, flight plan 150 is filed with a reporting service. By filing flight plan 150, flight plans for additional unmanned aerial vehicles may be created to avoid undesirable contact with unmanned aerial vehicle 110.

Figure 2:
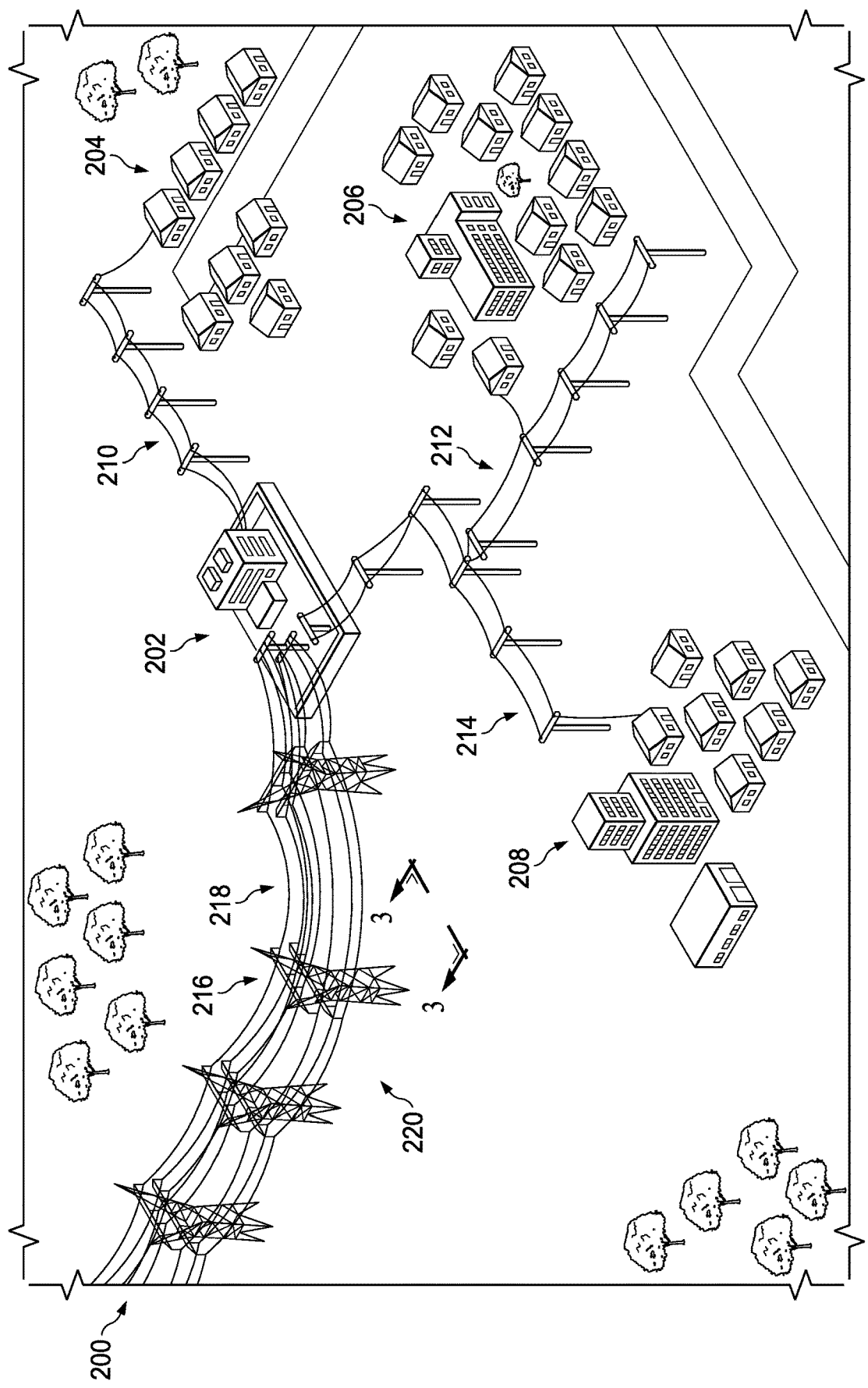
FIG. 2 is an illustration of a region with a high voltage power line in accordance with an illustrative embodiment.

Turning now to FIG. 2, an illustration of a region with a high voltage power line is depicted in accordance with an illustrative embodiment. Region 200 is a physical implementation of region 108 of FIG. 1. In region 200, power plant 202 generates electricity that is distributed to neighborhood 204, neighborhood 206, and neighborhood 208 through distribution lines 210, distribution lines 212, and distribution lines 214 respectively. Region 200 includes transmission line 216. Transmission line 216 is high voltage power line 218. High voltage power line 218 is a physical implementation of high voltage power line 146 of FIG. 1.

High voltage power line 218 has an electromagnetic force (EMF) of sufficient strength to charge an unmanned aerial vehicle. In some illustrative examples, an unmanned aerial vehicle charges a rechargeable battery while flying a specified distance from high voltage power line 218. In some illustrative examples, an unmanned aerial vehicle charges a rechargeable battery while flying at least a specified distance from high voltage power line 218.

The illustration of region 200 in FIG. 2 is not meant to imply physical or architectural limitations to the manner in which an illustrative embodiment may be implemented. For example, although high voltage power line 218 are depicted above ground, in some illustrative examples, high voltage power lines are underground.

High voltage power line 218 and accompanying support structures such as transformers, towers, and other structures associated with high voltage power line 218 are within right-of-way 220. In some non-depicted examples, additional utilities are positioned in right-of-way 220. Additional utilities may be positioned above or below ground in right-of-way 220. For example, in a rural environment, underground utilities or pipelines are buried in the same easements as high voltage powerlines. In these examples, an unmanned aerial vehicle may monitor the utilities or pipelines while recharging using the high voltage power lines.

The utilities include at least one of a water pipe, a waterway, a gas pipe, a solar panel, an oil pipe, or any other desirable type of utility. In some illustrative examples, the utilities within right-of-way 220 are inspected using a sensor of an unmanned aerial vehicle while flying the unmanned aerial vehicle the specified distance from the high voltage power line 218.

Figure 3:
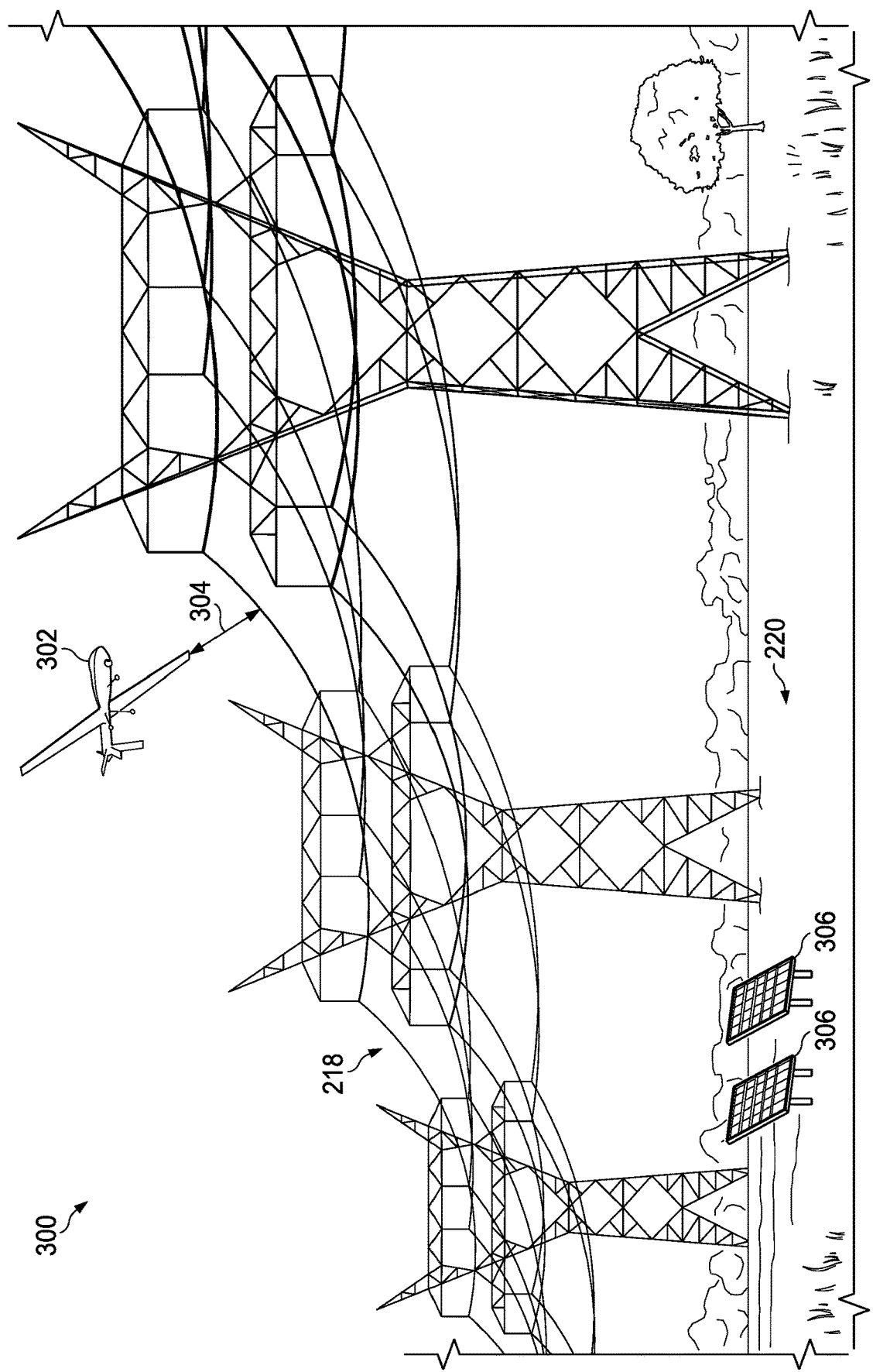
FIG. 3 is an illustration of an unmanned aerial vehicle flying in a region with a high voltage power line in accordance with an illustrative embodiment.

Turning now to FIG. 3, an illustration of an unmanned aerial vehicle flying in a region with a high voltage power line is depicted in accordance with an illustrative embodiment. View 300 is a view along direction 3 in FIG. 2. In view 300, unmanned aerial vehicle 302 is flying distance 304 from high voltage power line 218. Unmanned aerial vehicle 302 is a physical implementation of unmanned aerial vehicle 110 of FIG. 1.

In some illustrative examples, distance 304 is a physical implementation of specified distance 158 of FIG. 1. In some illustrative examples, distance 304 is up to 200 meters. Distance 304 is selected based upon any desirable characteristics. In some illustrative examples, distance 304 is selected such that distance 304 is a maximum length for unmanned aerial vehicle 302 to have a pre-defined value for recharging efficiency. In some illustrative examples, distance 304 is selected based on weather information for region 200 of FIG. 2. In some illustrative examples, distance 304 is selected based on the capabilities of unmanned aerial vehicle 302. In some illustrative examples, distance 304 is selected to maintain a set amount of power in a rechargeable battery of unmanned aerial vehicle 302.

As depicted, solar panels 306 are positioned in right-of-way 220. Although not visible, other utilities, such as water pipes, gas pipes, oil pipes, or other utilities may be buried in right-of-way 220. In other non-depicted examples other utilities, such as water pipes, waterways, gas pipes, oil pipes, or other utilities may be present above ground in right-of-way 220.

Unmanned aerial vehicle 302 may be used to inspect utilities within right-of-way 220. For example, unmanned aerial vehicle 302 may be used to inspect at least one of high voltage power lines 218 or solar panels 306. When additional utilities are present in right-of-way 220, unmanned aerial vehicle 302 may inspect the additional utilities present in right-of-way 220.

A sensor of unmanned aerial vehicle 302 is used to inspect utilities within right-of-way 220. In some illustrative examples, unmanned aerial vehicle 302 has more than one sensor configured to perform inspections of utilities within a right of way, such as right-of-way 220. Sensors on unmanned aerial vehicle 302 take any desirable form. In some illustrative examples, at least one of a proximity sensor, a magnetic field sensor, an IR camera, a visible spectrum camera, or any other desirable type of sensor is present on unmanned aerial vehicle 302. In some illustrative examples, utilities in right-of-way 220 are inspected for at least one of efficiency of operation, an unauthorized condition, an unauthorized event, a leak, or damage.

High voltage power line 218 in right-of-way 220 is inspected in any desirable way. In some illustrative examples, high voltage power line 218 is visually inspected. In these illustrative examples, a visual sensor, such as a camera, is present on unmanned aerial vehicle 302 and used to inspect high voltage power line 218.

High voltage power line 218 can be visually inspected for at least one of an unauthorized condition, an unauthorized event, or damage. For example, high voltage power line 218 can be visually inspected for an unauthorized line connected to high voltage power line 218. As another example, high voltage power line 218 can be visually inspected for an unauthorized unmanned aerial vehicle recharging using high voltage power line 218. As yet a further example, high voltage power line 218 can be visually inspected for damage, such as low hanging lines, disconnected lines, broken supports, or other types of physical damage to high voltage power line 218.

High voltage power line 218 can be inspected using a magnetic field sensor. For example, high voltage power line 218 can be inspected for an expected strength of a magnetic field. When a lower than expected magnetic field is detected, high voltage power line 218 may have an unauthorized charging event, an undesirable efficiency, or other unauthorized or undesirable condition or event.

In some illustrative examples, utilities buried within right-of-way 220 are inspected using heat detection sensors, such as an IR camera. In some illustrative examples, utilities such as gas, water, or oil are transported at a different temperature than ambient temperature. For example, liquified natural gas is transported at a temperature different than the environmental temperature. When leaks or damage to utilities buried within right-of-way 220 are present, differences in temperature between the utility and the environment can be used to detect the leaks or damage. In some illustrative examples, an unauthorized condition, an unauthorized event, a leak, or damage to buried utilities is inspected visually using a visual camera.

The illustration of view 300 in FIG. 3 is not meant to imply physical or architectural limitations to the manner in which an illustrative embodiment may be implemented. For example, unmanned aerial vehicle 302 is depicted as a fixed wing aircraft. However, in other illustrative examples, an unmanned aerial vehicle may be a rotary unmanned aerial vehicle.

As another example, any desirable type of and quantity of sensors (not depicted) are present on unmanned aerial vehicle 302. As yet another example, other utilities, such as gas pipes, water pipes, waterways, oil pipes, or other desirable types of utilities are present above ground in right-of-way 220.

As another example, utilities, such as waterways, may be present outside of right-of-way 220. In some illustrative examples, utilities outside of right-of-way 220 may be inspected while recharging unmanned aerial vehicle 302.

Figure 4:
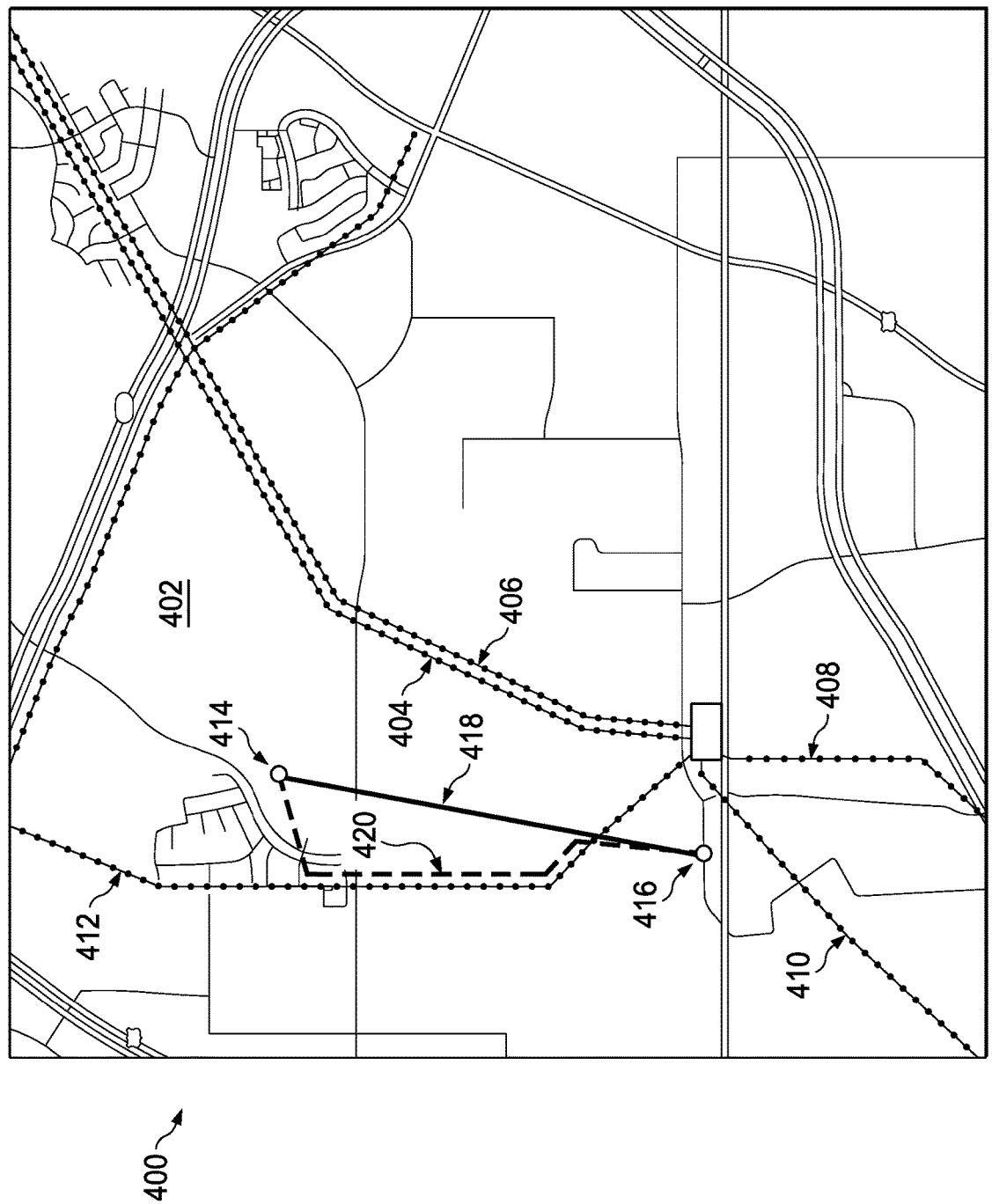
FIG. 4 is an illustration of a map of a region with high voltage power lines in accordance with an illustrative embodiment.

Turning now to FIG. 4, an illustration of a map of a region with high voltage power lines is depicted in accordance with an illustrative embodiment. Map 400 is a physical implementation of high voltage map 160 of FIG. 1.

In map 400, region 402 has high voltage power line 404, high voltage power line 406, high voltage power line 408, high voltage power line 410, and high voltage power line 412. An unmanned aerial vehicle, such as unmanned aerial vehicle 110 of FIG. 1, may fly within region 402.

As depicted, map 400 has departure point 414 for an unmanned aerial vehicle and arrival point 416. Flight plan 418 is a shortest path for an unmanned aerial vehicle traveling from departure point 414 to arrival point 416.

In some illustrative examples, flight plan 420 is created to charge a rechargeable battery of an unmanned aerial vehicle. Flight plan 420 also meets an objective or a destination for an unmanned aerial vehicle. In this illustrative example, flight plan 420 meets a destination, arrival point 416. Flight plan 420 is an alternative to flight plan 418. Flight plan 420 flies an unmanned aerial vehicle a specified distance from high voltage power line 412. Although flight plan 420 is longer than flight plan 418, in some illustrative examples, a rechargeable battery of the unmanned aerial vehicle may have a greater charge after taking flight plan 420.

The different components shown in FIGS. 2-4 may be combined with components in FIG. 1, used with components in FIG. 1, or a combination of the two. Additionally, some of the components in FIGS. 2-4 may be illustrative examples of how components shown in block form in FIG. 1 can be implemented as physical structures.

Figure 5:
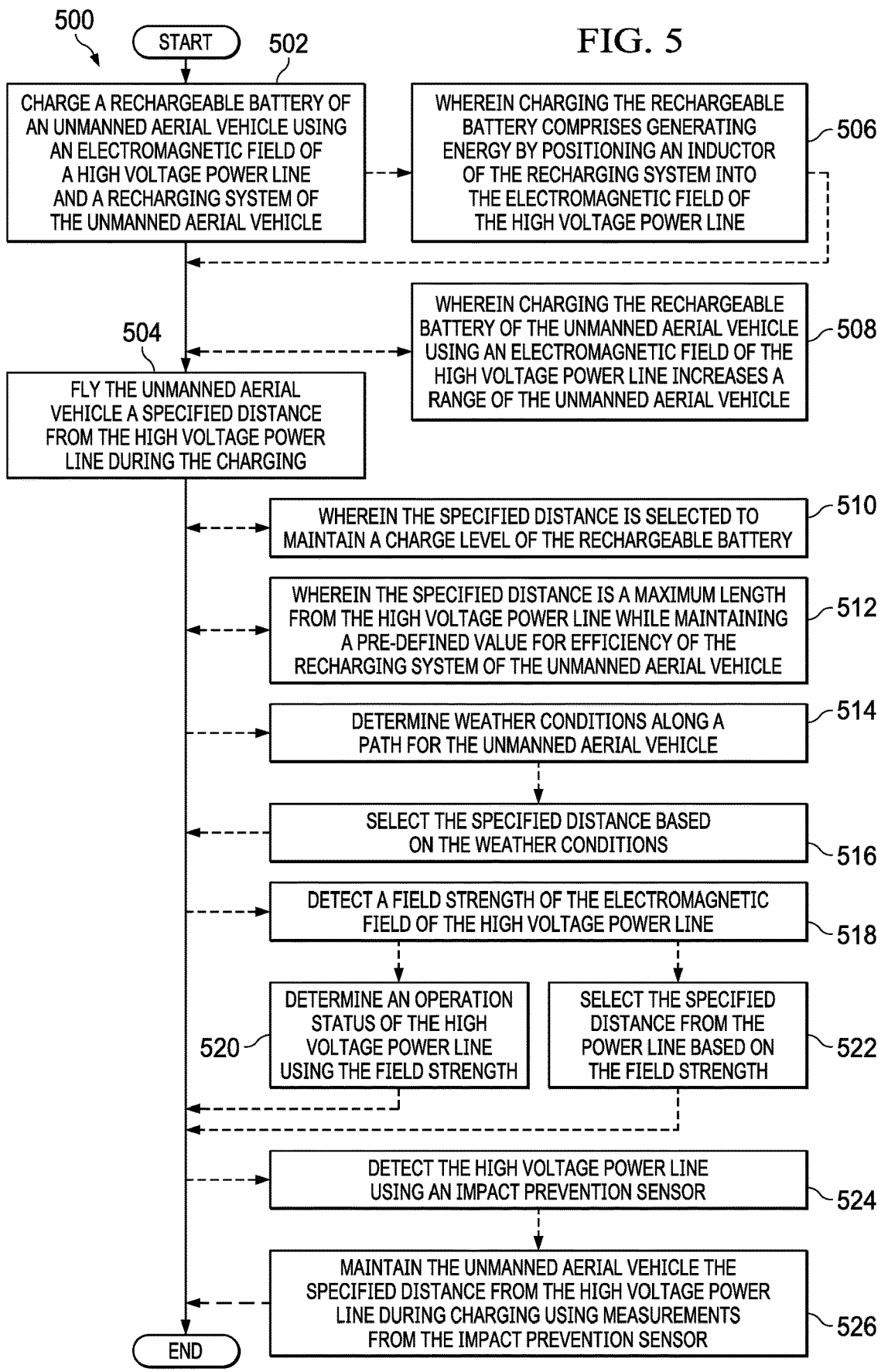
FIG. 5 is an illustration of a flowchart of a method for flying an unmanned aerial vehicle in a region in accordance with an illustrative embodiment.

Turning now to FIG. 5, an illustration of a flowchart of a method for flying an unmanned aerial vehicle in a region is depicted in accordance with an illustrative embodiment. Method 500 may be implemented in environment 100 of FIG. 1. Method 500 may be performed in region 200 of FIGS. 2-3. Method 500 may be performed in region 402 of FIG. 4.

Method 500 charges a rechargeable battery of an unmanned aerial vehicle using an electromagnetic field of a high voltage power line and a recharging system of the unmanned aerial vehicle (operation 502). Method 500 flies the unmanned aerial vehicle a specified distance from the high voltage power line during the charging (operation 504). Afterwards, method 500 terminates.

Several optional operations are also depicted in FIG. 5. In some illustrative examples, charging the rechargeable battery comprises generating energy by positioning an inductor of the recharging system into the electromagnetic field of the high voltage power line (operation 506). In some illustrative examples, charging the rechargeable battery of the unmanned aerial vehicle using an electromagnetic field of the high voltage power line increases a range of the unmanned aerial vehicle (operation 508).

In some illustrative examples, the specified distance is selected to maintain a charge level of the rechargeable battery (operation 510). In some illustrative examples, the specified distance is a maximum length from the high voltage power line while maintaining a pre-defined value for efficiency of the recharging system of the unmanned aerial vehicle (operation 512). In some illustrative examples, the pre-defined value for efficiency is a maximum value for efficiency. The efficiency of the recharging system is affected by a field strength of the high voltage power line, an ambient temperature, and charging settings for the rechargeable battery.

In some illustrative examples, method 500 determines weather conditions along a path for the unmanned aerial vehicle (operation 514). In some illustrative examples, method 500 selects the specified distance based on the weather conditions (operation 516). For example, the specified distance may be selected based on wind conditions. In some illustrative examples, the specified distance may be greater when wind conditions are greater.

In some illustrative examples, method 500 detects a field strength of the electromagnetic field of the high voltage power line (operation 518). In some illustrative examples, method 500 determines an operation status of the high voltage power line using the field strength (operation 520). For example, when the field strength is significantly lower than expected, the high voltage power line may be partially operational or non-operational. In some illustrative examples, when the field strength is significantly lower than expected, the unmanned aerial vehicle may send communications requesting additional inspection or maintenance for the high voltage power line. In some illustrative examples, when the field strength is significantly lower than expected and when the unmanned aerial vehicle has an attached camera, pictures of the high voltage power line may be taken in response to lower than expected field strength.

In some illustrative examples, method 500 selects the specified distance from the power lines based on the field strength (operation 522). For example, the specified distance may be greater when the field strength is greater.

In some illustrative examples, method 500 detects the high voltage power line using an impact prevention sensor (operation 524). In some illustrative examples, method 500 maintains the unmanned aerial vehicle the specified distance from the high voltage power line during charging using measurements from the impact prevention sensor (operation 526). In some illustrative examples, the impact prevention sensor is one of a SONAR sensor, a RADAR sensor, an optical sensor, or a field strength sensor.

Figure 6:
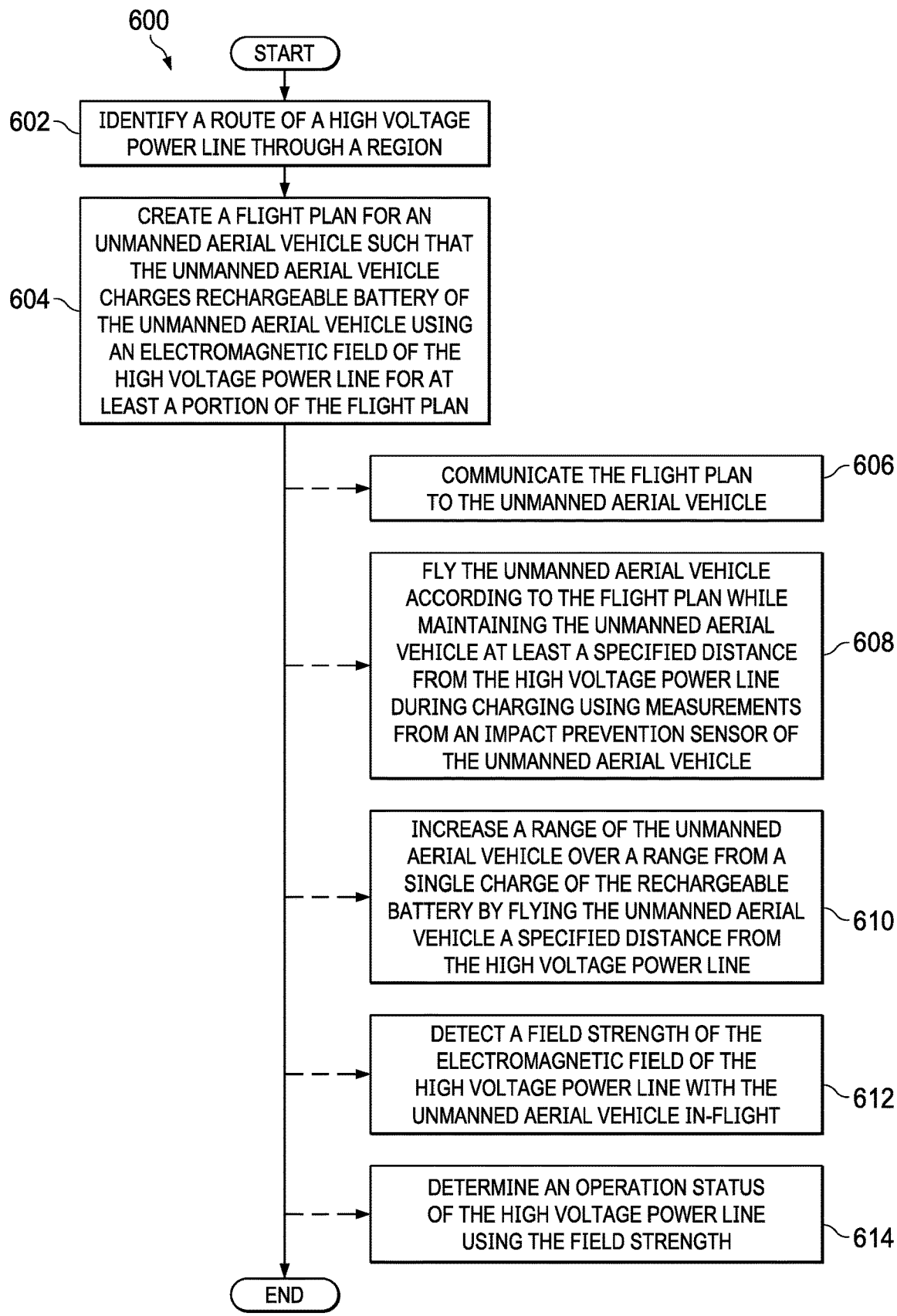
FIG. 6 is an illustration of a flowchart of a method for creating a flight plan for an unmanned aerial vehicle in a region in accordance with an illustrative embodiment.

Turning now to FIG. 6, an illustration of a flowchart of a method for creating a flight plan for an unmanned aerial vehicle in a region is depicted in accordance with an illustrative embodiment. Method 600 may be implemented in environment 100 of FIG. 1. Method 600 may be performed using high voltage map 160 of FIG. 1. A flight plan generated by method 600 may be flown within region 200 of FIGS. 2-3. Method 600 may be performed using a map such as map 400 of FIG. 4.

Method 600 identifies a route of a high voltage power line through a region (operation 602). Method 600 creates a flight plan for an unmanned aerial vehicle such that the unmanned aerial vehicle charges rechargeable battery of the unmanned aerial vehicle using an electromagnetic field of the high voltage power line for at least a portion of the flight plan (operation 604). Afterwards, method 600 terminates.

Several optional operations are also depicted in FIG. 6. In some illustrative examples, method 600 communicates the flight plan to the unmanned aerial vehicle (operation 606). In some illustrative examples, method 600 flies the unmanned aerial vehicle according to the flight plan while maintaining the unmanned aerial vehicle at least a specified distance from the high voltage power line during charging using measurements from an impact prevention sensor of the unmanned aerial vehicle (operation 608).

In some illustrative examples, method 600 increases a range of the unmanned aerial vehicle over a range from a single charge of the rechargeable battery by flying the unmanned aerial vehicle at least a specified distance from the high voltage power line (operation 610). In some illustrative examples, method 600 detects a field strength of the electromagnetic field of the high voltage power line with the unmanned aerial vehicle in-flight (operation 612).

In some illustrative examples, method 600 determines an operation status of the high voltage power line using the field strength (operation 614). For example, when the field strength is significantly lower than expected, the high voltage power line may be partially operational or non-operational. In some illustrative examples, when the field strength is significantly lower than expected, the unmanned aerial vehicle may send communications requesting additional inspection or maintenance for the high voltage power line. In some illustrative examples, when the field strength is significantly lower than expected and when the unmanned aerial vehicle has an attached camera, pictures of the high voltage power line may be taken in response to lower than expected field strength.

Figure 7:
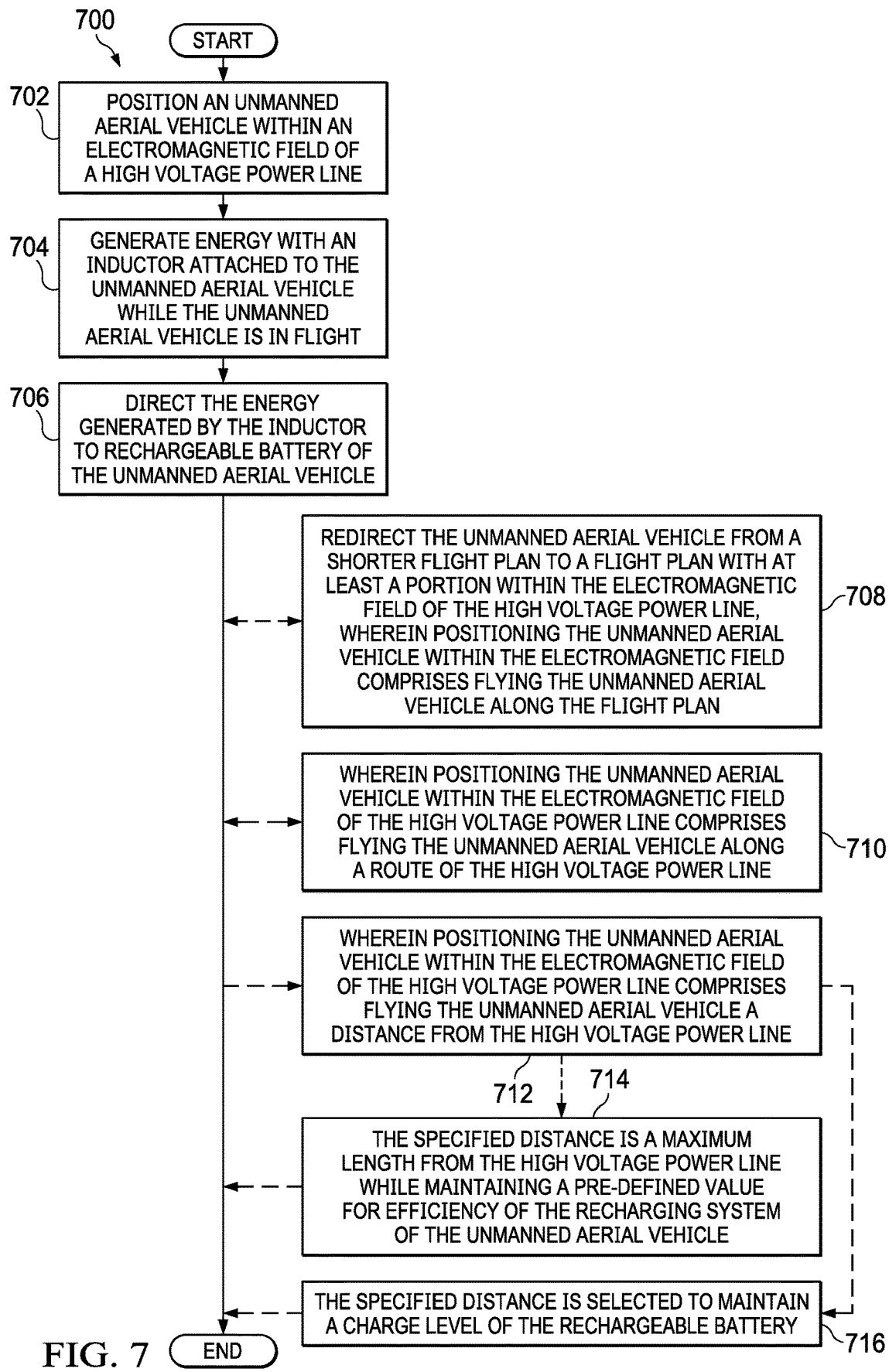
FIG. 7 is an illustration of a flowchart of a method for flying an unmanned aerial vehicle in a region in accordance with an illustrative embodiment.

Turning now to FIG. 7, an illustration of a flowchart of a method for flying an unmanned aerial vehicle in a region is depicted in accordance with an illustrative embodiment. Method 700 may be implemented using unmanned aerial vehicle 110 of FIG. 1. Method 700 may be performed in region 200 of FIGS. 2-3 using unmanned aerial vehicle 302. Method 700 may be performed in region 402 of FIG. 4.

Method 700 positions an unmanned aerial vehicle within an electromagnetic field of a high voltage power line (operation 702). Method 700 generates energy with an inductor attached to the unmanned aerial vehicle while the unmanned aerial vehicle is in flight (operation 704). Method 700 directs the energy generated by the inductor to rechargeable battery of the unmanned aerial vehicle (operation 706). Afterwards, method 700 terminates.

Several optional operations are also depicted in FIG. 7. In some illustrative examples, method 700 redirects the unmanned aerial vehicle from a shortest flight plan to a flight plan with at least a portion within an electromagnetic field of the high voltage power line, wherein positioning the unmanned aerial vehicle within the electromagnetic field comprises flying the unmanned aerial vehicle along the flight plan (operation 708).

In some illustrative examples, the flight plan takes into account supporting structures of the high voltage power line. In some illustrative examples, the flight plan directs the unmanned aerial vehicle around towers holding up the high voltage power line. In some illustrative examples, the flight plan is at least partially parallel to the high voltage power line. In other illustrative examples, the flight plan is within the electromagnetic field of the high voltage power line, but not parallel to the high voltage power line. In some illustrative examples, the flight plan has a non-parallel pattern such as a corkscrew within the electromagnetic field of the high voltage power line.

In some illustrative examples for method 700, positioning the unmanned aerial vehicle within the electromagnetic field of the high voltage power line comprises flying the unmanned aerial vehicle along a route of the high voltage power line (operation 710). In some illustrative examples for method 700, positioning the unmanned aerial vehicle within the electromagnetic field of the high voltage power line comprises flying the unmanned aerial vehicle a specified distance from the high voltage power line (operation 712). In some illustrative examples, the specified distance is a maximum length from the high voltage power line while maintaining a pre-defined value for efficiency of the recharging system of the unmanned aerial vehicle (operation 714). In some illustrative examples, the specified distance is selected to maintain a charge level of the rechargeable battery (operation 716).

Figure 8:
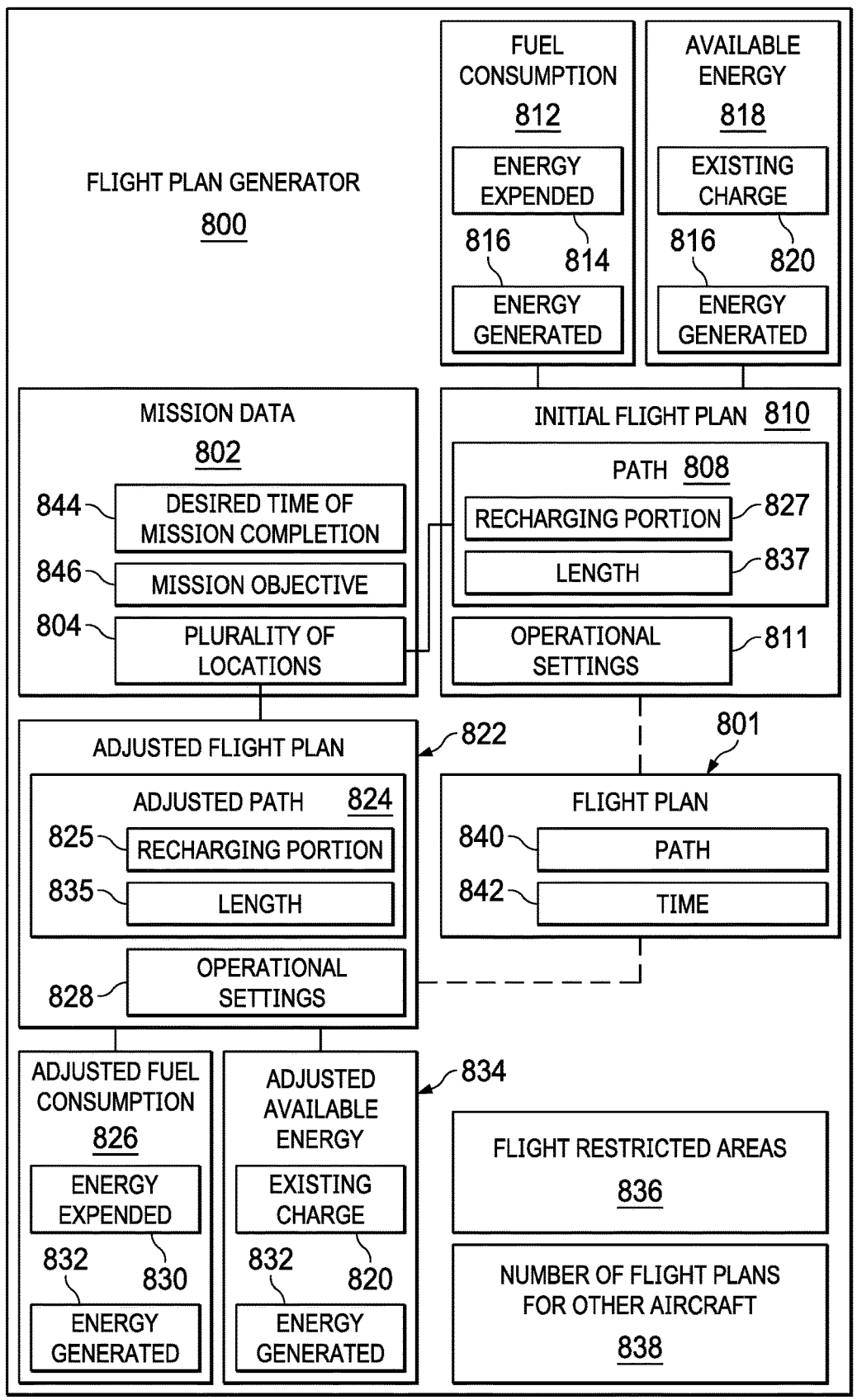
FIG. 8 is an illustration of a block diagram of a flight plan generator in accordance with an illustrative embodiment.

Turning now to FIG. 8, an illustration of a block diagram of a flight plan generator is depicted in accordance with an illustrative embodiment. Flight plan generator 800 is an implementation of flight plan generator 148 of FIG. 1. Flight plan generator 800 may be used to create a flight plan that may be flown within region 200 of FIGS. 2-3. A flight plan generated by flight plan generator 800 may be flown by unmanned aerial vehicle 302. Flight plan generator 800 may generate at least one of flight plan 418 or flight plan 420. In some illustrative examples, flight plan generator 800 is present on the unmanned aerial vehicle, such as unmanned aerial vehicle 110 of FIG. 1.

Flight plan generator 800 utilizes aeronautical data from database 162, such as high voltage map 160. Flight plan generator 800 generates flight plan 801. Flight plan generator 800 receives mission data 802 for an unmanned aerial vehicle, such as unmanned aerial vehicle 110, including plurality of locations 804 for the unmanned aerial vehicle. Flight plan generator 800 receives mission data 802 from any desirable source, such as database 162 of FIG. 1 or a communications system, such as communications system 156. In some illustrative examples, database 162 of FIG. 1 contains aeronautical information for at least one of flight restricted areas or utility lines.

In some illustrative examples, plurality of locations 804 includes locations for the unmanned aerial vehicle to travel to or over. In some illustrative examples, plurality of locations 804 includes waypoints for the unmanned aerial vehicle. In some illustrative examples, plurality of locations 804 includes locations for the unmanned aerial vehicle to travel to perform mission objective 846.

Flight plan generator 800 calculates path 808 for an unmanned aerial vehicle including the plurality of locations 804. In some illustrative examples, path 808 includes portions for charging the unmanned aerial vehicle using a high voltage power line.

Flight plan generator 800 creates initial flight plan 810 for the unmanned aerial vehicle that includes path 808 and operational settings 811 for the unmanned aerial vehicle. Operational settings 811 includes at least one of a speed, an amount of power sent to motors of the unmanned aerial vehicle, a number of motors to operate on the unmanned aerial vehicle, or any other setting for components of the unmanned aerial vehicle.

Flight plan generator 800 calculates fuel consumption 812 associated with initial flight plan 810. Fuel consumption 812 includes energy expended 814 and energy generated 816 by the unmanned aerial vehicle. Energy expended 814 includes energy used by the unmanned aerial vehicle to follow path 808 using operational settings 811. In some illustrative examples, energy expended 814 takes into account weather during the time of initial flight plan 810. Energy generated 816 includes energy generated by recharging based on proximity to a high voltage power line in following path 808.

Flight plan generator 800 determines whether fuel consumption 812 is greater than available energy 818 of the unmanned aerial vehicle. Available energy 818 comprises existing charge 820 of the rechargeable battery and energy generated 816 by the unmanned aerial vehicle flying initial flight plan 810. Existing charge 820 is the charge of at least one rechargeable battery of the unmanned aerial vehicle. Existing charge 820 would limit the range of the unmanned aerial vehicle without recharging. With energy generated 816, the range of the unmanned aerial vehicle is increased.

Flight plan generator 800 selects initial flight plan 810 as flight plan 801 when the fuel consumption 812 is not greater than available energy 818. When fuel consumption 812 is greater than available energy 818, initial flight plan 810 is not selected as flight plan 801. When fuel consumption 812 is greater than available energy 818, adjusted flight plan 822 for the unmanned aerial vehicle is created. In some illustrative examples, adjusted flight plan 822 is created by adjusting initial flight plan 810. Creating adjusted flight plan 822 includes increasing a portion of the flight plan wherein the unmanned aerial vehicle flies a specified distance from a high voltage power line. Adjusted path 824 has recharging portion 825 that has unmanned aerial vehicle flying a specified distance from a high voltage power line. Recharging portion 825 of adjusted path 824 is longer than recharging portion 827 of path 808 that has the unmanned aerial vehicle flying a specified distance from a high voltage power line. By recharging portion 825 being longer than recharging portion 827, adjusted flight plan 822 has a greater amount of energy in energy generated 832 than energy generated 816 of initial flight plan 810. In some illustrative examples, flight plan generator 800 is configured to create adjusted flight plan 822 while avoiding flight restricted areas 836.

Flight plan generator 800 calculates adjusted fuel consumption 826 associated with adjusted flight plan 822. Adjusted fuel consumption 826 is calculated based on adjusted path 824 and operational settings 828. Adjusted fuel consumption 826 includes energy expended 830 and energy generated 832 by the unmanned aerial vehicle. Energy expended 830 includes energy used by the unmanned aerial vehicle to follow adjusted path 824 using operational settings 828. In some illustrative examples, energy expended 830 takes into account weather during the time of adjusted flight plan 822. Energy generated 832 includes energy generated in any desirable way by the unmanned aerial vehicle. In some illustrative examples, energy generated 832 includes energy generated by recharging based on proximity to a high voltage power line in following adjusted path 824.

Flight plan generator 800 determines whether adjusted fuel consumption 826 is greater than adjusted available energy 834. Adjusted available energy 834 comprises existing charge 820 of the rechargeable battery and energy generated 832 by the unmanned aerial vehicle flying adjusted flight plan 822. Flight plan generator 800 selects adjusted flight plan 822 as flight plan 801 when adjusted fuel consumption 826 is not greater than adjusted available energy 834.

In some illustrative examples, creating adjusted flight plan 822 creates adjusted path 824 with a greater length 835 than path 808. In some illustrative examples, length 835 of adjusted path 824 is greater than length 837 of path 808. Although length 835 of adjusted path 824 is greater than length 837, when recharging portion 825 is greater than recharging portion 827, energy generated 832 is greater than energy generated 816.

In some illustrative examples, flight plan generator 800 creates flight plan 801 to avoid flight restricted areas 836. In some illustrative examples, flight restricted areas 836 include permanent and temporary flight restricted areas. In some illustrative examples, flight restricted areas 836 includes times for temporarily flight restricted areas. For example, some areas may be temporarily restricted flight areas due to a government official traveling within the area, wildfire suppression activities, sporting events, weather events, or other types of temporary situations. In some illustrative examples, flight plan generator 800 creating adjusted flight plan 822 comprises avoiding flight restricted areas 836.

In some illustrative examples, flight plan generator 800 determines whether flight plan 801 interferes with a flight plan of another aircraft. The flight plan of another aircraft is one of number of flight plans for other aircraft 838. Flight plan generator 800 modifies at least one of path 840 or time 842 of flight plan 801 if flight plan 801 interferes with a flight plan of another aircraft.

In some illustrative examples, mission data 802 comprises desired time of mission completion 844 and mission objective 846. In some illustrative examples, mission objective 846 is utilities inspection, and plurality of locations 804 for the unmanned aerial vehicle in mission data 802 comprises locations for inspecting utilities within a right-of-way. Flight plan generator 800 generates operational settings 811 based on at least one of weather or desired time of mission completion 844.

In some illustrative examples, flight plan generator 800 generates path 840 taking into account weather. For example, path 840 may have a greater recharging portion along a high voltage power line when the weather is cloudy if the unmanned aerial vehicle is capable of recharging using solar power. In this example, the unmanned aerial vehicle receives less recharging power from solar power than during a sunny time and flight plan generator 800 increases the energy generated from flying a set distance from a high voltage power line to compensate for having less solar power.

Turning now to FIG. 9, an illustration of a flowchart of a method of monitoring utilities is depicted in accordance with an illustrative embodiment. Method 900 is a method of monitoring utilities. Method 900 may be implemented using unmanned aerial vehicle 110 of FIG. 1. Method 900 may be performed in region 200 of FIGS. 2-3 using unmanned aerial vehicle 302. Method 900 may be performed in region 402 of FIG. 4.

Method 900 charges a rechargeable battery of an unmanned aerial vehicle using an electromagnetic field of a high voltage power line within the right-of-way and a recharging system of the unmanned aerial vehicle (operation 902). Method 900 flies the unmanned aerial vehicle a specified distance from the high voltage power line during the charging (operation 904). Method 900 inspects utilities using a sensor of the unmanned aerial vehicle while flying the unmanned aerial vehicle the specified distance from the high voltage power line (operation 906). Afterwards, method 900 terminates.

In some illustrative examples, inspecting utilities comprises imaging utility lines buried within the right-of-way (operation 908). In some illustrative examples, imaging utility lines comprising at least one of the high voltage power line, a water pipe, a waterway, a gas pipe, a solar panel, or an oil pipe (operation 910).

In some illustrative examples, charging the rechargeable battery of the unmanned aerial vehicle increases a range of the unmanned aerial vehicle over a range from an existing charge of the rechargeable battery by flying the unmanned aerial vehicle the specified distance from the high voltage power line (operation 912). In some illustrative examples, a length of the right-of-way is greater than the range of the unmanned aerial vehicle from an existing charge of the rechargeable battery, and method 900 further comprises inspecting the utilities along the length of the right-of-way while flying the unmanned aerial vehicle, wherein the unmanned aerial vehicle is capable of inspecting the utilities along the length of the right-of-way without landing the unmanned aerial vehicle. In some illustrative examples, a length of the right-of-way is greater than the range of the unmanned aerial vehicle from an existing charge of the rechargeable battery, and method 900 further comprises inspecting the utilities along the length of the right-of-way without stopping inspection of the utilities due to recharging of the unmanned aerial vehicle.

In some illustrative examples, inspecting the utilities using the sensor of the sensor of the unmanned aerial vehicle comprises inspecting utilities within the right-of-way while flying the unmanned aerial vehicle the specified distance from the high voltage power line (operation 914). In some illustrative examples, inspecting the utilities comprises inspecting pipelines within the right-of-way for at least one of efficiency of operation, an unauthorized condition, an unauthorized event, a leak, or damage (operation 916). In some illustrative examples, method 900 further comprises sending an alert when at least one of an unacceptable efficiency of operation, an unauthorized condition, an unauthorized event, a leak, or damage is detected (operation 918).

In some illustrative examples, method 900 further comprises inspecting the utilities comprises inspecting the high voltage power line for at least one of an unauthorized condition, an unauthorized event, efficiency of operation, or structural damage (operation 920). In some illustrative examples, flying the unmanned aerial vehicle a specified distance from the high voltage power line during the charging comprises maintaining the unmanned aerial vehicle at least a specified distance from the high voltage power line during charging using measurements from a sensor of the unmanned aerial vehicle (operation 922).

Figure 10B:
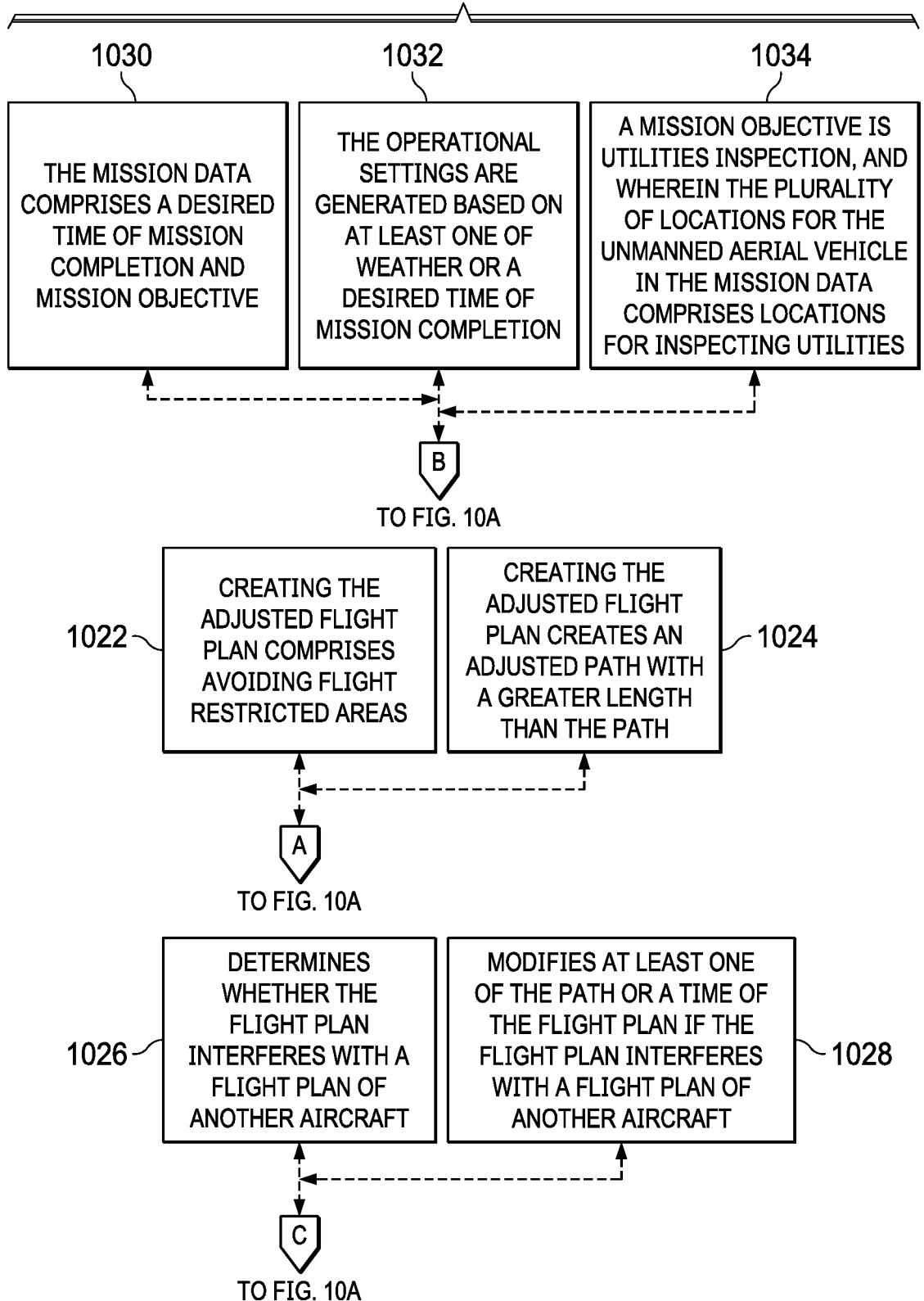

Turning now to FIGS. 10A and 10B, an illustration of a flowchart of a method of generating a flight plan for an unmanned aerial vehicle including charging a rechargeable battery of the unmanned aerial vehicle is depicted in accordance with an illustrative embodiment. Method 1000 may generate flight plan 150 for unmanned aerial vehicle 110 of FIG. 1. Method 1000 may be performed to generate a flight plan for unmanned aerial vehicle 302 to fly within region 200 of FIGS. 2-3. Method 1000 may be performed to generate at least one of flight plan 418 or flight plan 420 of FIG. 4.

Method 1000 generates a flight plan for an unmanned aerial vehicle including charging a rechargeable battery of the unmanned aerial vehicle. Method 1000 receives mission data for the unmanned aerial vehicle, including a plurality of locations for the unmanned aerial vehicle (operation 1002).

Method 1000 calculates, using a processor, a path for the unmanned aerial vehicle including the plurality of locations (operation 1004).

Method 1000 creates an initial flight plan for the unmanned aerial vehicle that includes the path and operational settings for the unmanned aerial vehicle (operation 1006).

Method 1000 calculates a fuel consumption associated with the initial flight plan, the fuel consumption including energy expended and energy generated by the unmanned aerial vehicle (operation 1008).

Method 1000 determines whether fuel consumption is greater than an available energy of the unmanned aerial vehicle, the available energy comprising an existing charge of the rechargeable battery and the energy generated by the unmanned aerial vehicle flying the initial flight plan (operation 1010).

Method 1000 selects the initial flight plan as the flight plan when the fuel consumption is not greater than the available energy (operation 1012).

Method 1000 creates an adjusted flight plan for the unmanned aerial vehicle when the fuel consumption is greater than the available energy, wherein creating the adjusted flight plan includes increasing a portion of the flight plan wherein the unmanned aerial vehicle flies a specified distance from a high voltage power line (operation 1014).

Method 1000 calculates an adjusted fuel consumption associated with the adjusted flight plan (operation 1016).

Method 1000 determines whether the adjusted fuel consumption is greater than an adjusted available energy, wherein the adjusted available energy comprises the existing charge of the rechargeable battery and energy generated by the unmanned aerial vehicle flying the adjusted flight plan (operation 1018).

Method 1000 selects the adjusted flight plan as the flight plan when the adjusted fuel consumption is not greater than the adjusted available energy (operation 1020). Afterwards, method 1000 terminates.

FIG. 10B depicts optional operations for method 1000. In some illustrative examples, creating the adjusted flight plan comprises avoiding flight restricted areas (operation 1022). The illustrative examples take into account that flight restricted areas may be permanent geographic areas. The illustrative examples take into account that flight restricted areas may change based on time. In some illustrative examples, method 1000 avoids flight restricted areas based on an intended date and time of the flight plan. In some illustrative examples, creating the adjusted flight plan creates an adjusted path with a greater length than the path (operation 1024).

In some illustrative examples, method 1000 determines whether the flight plan interferes with a flight plan of another aircraft (operation 1026). The other aircraft may be any type of aircraft, such as a commercial aircraft, military aircraft, manned aircraft, or an unmanned aircraft. In some illustrative examples, method 1000 modifies at least one of the path or a time of the flight plan if the flight plan interferes with a flight plan of another aircraft (operation 1028).

In some illustrative examples, the mission data comprises a desired time of mission completion and mission objective (operation 1030). The mission objective includes any desirable goal such as utilities inspection, area surveillance, package delivery, wildlife or livestock tracking, or any other desirable goal.

In some illustrative examples, the operational settings are generated based on at least one of weather or a desired time of mission completion (operation 1032). For example, a speed of travel, an amount of power sent to a number of motors, or any other operational settings for the unmanned aerial vehicle take into account the weather. For example, an amount of power may need to be increased to the motors of an unmanned aerial vehicle to take into account wind speed. As another example, the speed of the unmanned aerial vehicle may be increased or decreased based on a desired time of mission completion.

In some illustrative examples, a mission objective is utilities inspection, and wherein the plurality of locations for the unmanned aerial vehicle in the mission data comprises locations for inspecting utilities (operation 1034). In some illustrative examples, the plurality of locations for the unmanned aerial vehicle in the mission data comprises locations for inspecting utilities within a right-of-way.

The flowcharts and block diagrams in the different depicted embodiments illustrate the architecture, functionality, and operation of some possible implementations of apparatus and methods in an illustrative embodiment. In this regard, each block in the flowcharts or block diagrams may represent a module, a segment, a function, and/or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added, in addition to the illustrated blocks, in a flowchart or a block diagram.

In some illustrative examples, not all blocks of method 500, method 600, and method 700 are performed. For example, each of method 500, method 600, method 700, method 900, and method 1000 have optional steps described. For example, operations 908 through 922 may be optional. As another example, operations 1022 through 1034 may be optional.

The illustrative examples allow for recharging of unmanned aerial vehicles (UAVs) while flying by using the Electro Magnetic Field (EMF) that radiates from high power lines to generate a charging current on through use of an inductor (coil) and charging circuitry on board the UAV. Whereas normally UAVs avoid flying near high voltage power lines due to collision potential, if equipped with a map and sensors as in the illustrative examples, UAVs can avoid colliding with the power lines or towers. Thus, a UAV can fly near enough to a power line to recharge its batteries via an inductor and charging circuitry, while staying at a reasonably safe distance from the towers. In these illustrative examples, recharging using an EMF may be used by any type of unmanned aerial vehicles, including rotary UAVs or fixed wing UAVs.

In some of the illustrative examples, a flight planning system optimizes flight plans to enable UAVs to fly along power lines for part of their routes of flight to recharge or extend their flights. In some illustrative examples, a guidance system of a UAV may use a voltage reading to further gauge distance to the power lines in addition to a map of power line towers. Further, the UAV could be programmed to loiter around a specified area of power lines until recharged. For example, a UAV may hover near a power line to recharge. In some illustrative examples, a flight plan (otherwise known as a flight path) is plotted along the power lines to facilitate long distance routes.

This would enable a UAV to fly along the power line, taking charge to extend its useful range while monitoring both the power line and underground pipeline to check for leaks, damage, or sabotage. The UAV could even detect voltage transformer issues when a power line fails to provide a strong enough electrical field to facilitate recharging in-flight. By using high voltage power lines and an inductor, charging power can be obtained at a safe distance.

An illustrative embodiment of the present disclosure provides a method. A rechargeable battery of an unmanned aerial vehicle is charged using an electromagnetic field of a high voltage power line and a recharging system of the unmanned aerial vehicle. The unmanned aerial vehicle is flown a specified distance from the high voltage power line during the charging.

In some illustrative examples, the specified distance is a maximum length from the high voltage power line while maintaining a pre-defined value for efficiency of the recharging system of the unmanned aerial vehicle. In some illustrative examples, the specified distance is selected to maintain a charge level of the rechargeable battery. In some illustrative examples, charging the rechargeable battery comprises generating energy by positioning an inductor of the recharging system into the electromagnetic field of the high voltage power line.

In some illustrative examples, the method further comprises determining weather conditions along a path for the unmanned aerial vehicle; and selecting the specified distance based on the weather conditions. In some illustrative examples, the method further comprises detecting a field strength of the electromagnetic field of the high voltage power line; and determining an operation status of the high voltage power line using the field strength.

In some illustrative examples, the method further comprises detecting a field strength of the electromagnetic field of the high voltage power line; and selecting the specified distance from the high voltage power line based on the field strength. In some illustrative examples, charging the rechargeable battery of the unmanned aerial vehicle using an electromagnetic field of the high voltage power line increases a range of the unmanned aerial vehicle.

In some illustrative examples, the method further comprises detecting the high voltage power line using an impact prevention sensor; and maintaining the unmanned aerial vehicle the specified distance from the high voltage power line during charging using measurements from the impact prevention sensor. In some illustrative examples, the impact prevention sensor is one of a SONAR sensor, a RADAR sensor, an optical sensor, or a field strength sensor.

Another illustrative embodiment of the present disclosure provides a method. A route of a high voltage power line through a region is identified. A flight plan for an unmanned aerial vehicle is created such that the unmanned aerial vehicle charges a rechargeable battery of the unmanned aerial vehicle using an electromagnetic field of the high voltage power line for at least a portion of the flight plan.

In some illustrative examples, the method further comprises communicating the flight plan to the unmanned aerial vehicle; and flying the unmanned aerial vehicle according to the flight plan while maintaining the unmanned aerial vehicle at least a specified distance from the high voltage power line during charging using measurements from an impact prevention sensor of the unmanned aerial vehicle. In some illustrative examples, the method further comprises increasing a range of the unmanned aerial vehicle over a range from a single charge of the rechargeable battery by flying the unmanned aerial vehicle the specified distance from the high voltage power line. In some illustrative examples, the method further comprises detecting a field strength of the electromagnetic field of the high voltage power line with the unmanned aerial vehicle in-flight; and determining an operation status of the high voltage power line using the field strength.

A further illustrative embodiment of the present disclosure provides a method. An unmanned aerial vehicle is positioned within an electromagnetic field of a high voltage power line. Energy is generated with an inductor attached to the unmanned aerial vehicle. The energy generated by the inductor is directed to a rechargeable battery of the unmanned aerial vehicle.

In some illustrative examples, the method further comprises redirecting the unmanned aerial vehicle from a shorter flight plan to a flight plan with at least a portion within the electromagnetic field of the high voltage power line, wherein positioning the unmanned aerial vehicle within the electromagnetic field comprises flying the unmanned aerial vehicle along the flight plan. In some illustrative examples, positioning the unmanned aerial vehicle within the electromagnetic field of the high voltage power line comprises flying the unmanned aerial vehicle along a route of the high voltage power line. In some illustrative examples, positioning the unmanned aerial vehicle within the electromagnetic field of the high voltage power line comprises flying the unmanned aerial vehicle a specified distance from the high voltage power line.

In some illustrative examples, the specified distance is a maximum length from the high voltage power line while maintaining a pre-defined value for efficiency of a recharging system of the unmanned aerial vehicle. In some illustrative examples, the specified distance is selected to maintain a charge level of the rechargeable battery.

A yet further illustrative embodiment of the present disclosure provides an unmanned aerial vehicle. The unmanned aerial vehicle comprises a rechargeable battery, an inductor electrically connected to the rechargeable battery, and an impact prevention sensor.

In some illustrative examples, the impact prevention sensor is one of a SONAR sensor, a RADAR sensor, an optical sensor, or a field strength sensor. In some illustrative examples, the unmanned aerial vehicle further comprises a controller configured to fly the unmanned aerial vehicle such that the inductor charges the rechargeable battery using an electromagnetic field of a high voltage power line while flying the unmanned aerial vehicle a specified distance from the high voltage power line.

Any discussion of documents, acts, materials, devices, articles or the like which has been included in the present disclosure is not to be taken as an admission that any or all of these matters form part of the prior art base or were common general knowledge in the field relevant to the present disclosure as it existed before the priority date of each claim of this application.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method of generating a flight plan for an unmanned aerial vehicle including
   charging a rechargeable battery of the unmanned aerial vehicle,
   the method comprising:
   receiving mission data for the unmanned aerial vehicle, including a plurality of locations for the unmanned aerial vehicle;
   calculating, using a processor,
   a path for the unmanned aerial vehicle including the plurality of locations and a specified distance from a high voltage power line at which an energy is generated by the unmanned aerial vehicle;
   creating an initial flight plan for the unmanned aerial vehicle that includes the path and operational settings for the unmanned aerial vehicle;
   calculating a fuel consumption associated with the initial flight plan,
   the fuel consumption including an energy expended and the energy generated by the unmanned aerial vehicle flying the initial flight plan;
   determining whether the fuel consumption is greater than an available energy of the unmanned aerial vehicle,
   the available energy comprising an existing charge of the rechargeable battery and the energy generated by the unmanned aerial vehicle flying the initial flight plan;
   selecting the initial flight plan as the flight plan when the fuel consumption is not greater than the available energy;
   creating an adjusted flight plan for the unmanned aerial vehicle when the fuel consumption is greater than the available energy,
   wherein creating the adjusted flight plan includes increasing a portion of the flight plan, wherein the unmanned aerial vehicle flies a specified distance from a high voltage power line,
   wherein the portion of the flight plan is longer than a portion that the energy is generated by the unmanned aerial vehicle flying the initial flight plan;

calculating an adjusted fuel consumption associated with the adjusted flight plan;

determining whether the adjusted fuel consumption is greater than an adjusted available energy, wherein the adjusted available energy comprises the existing charge of the rechargeable battery and the energy generated by the unmanned aerial vehicle flying the adjusted flight plan; and selecting the adjusted flight plan as the flight plan when the adjusted fuel consumption is not greater than the adjusted available energy.

2. The method of claim 1, wherein creating the adjusted flight plan comprises avoiding flight restricted areas.

3. The method of claim 1, wherein creating the adjusted flight plan creates an adjusted path with a greater length than the path.

4. The method of claim 1 further comprising:

determining whether the flight plan interferes with a flight plan of another aircraft; and modifying at least one of the path or a time of the flight plan if the flight plan interferes with the flight plan of another aircraft.

5. The method of claim 1, wherein the mission data comprises a desired time of mission completion and a mission objective.

6. The method of claim 1, wherein the operational settings are generated based on at least one of weather or a desired time of mission completion.

7. The method of claim 1, wherein a mission objective is utilities inspection, and wherein the plurality of locations for the unmanned aerial vehicle in the mission data comprises locations for inspecting utilities.

8. An apparatus for generating a flight plan for an unmanned aerial vehicle, the apparatus comprising:

a flight plan generator configured to receive mission data for the unmanned aerial vehicle, including a plurality of locations for the unmanned aerial vehicle;

calculate a path for the unmanned aerial vehicle including the plurality of locations and a specified distance from a high voltage power line at which an energy is generated by the unmanned aerial vehicle;

create an initial flight plan for the unmanned aerial vehicle that includes the path and operational settings for the unmanned aerial vehicle;

calculate a fuel consumption associated with the initial flight plan, the fuel consumption including an energy expended and the energy generated by the unmanned aerial vehicle flying the initial flight plan;

determine whether the fuel consumption is greater than an available energy of the unmanned aerial vehicle, the available energy comprising an existing charge of a rechargeable battery and the energy generated by the unmanned aerial vehicle flying the initial flight plan;

selecting the initial flight plan as the flight plan when the fuel consumption is not greater than the available energy;

create an adjusted flight plan for the unmanned aerial vehicle when the fuel consumption is greater than the available energy, wherein creating the adjusted flight plan includes increasing a portion of the flight plan, wherein the unmanned aerial vehicle flies a specified distance from a high voltage power line, wherein the portion of the flight plan is longer than a portion that the energy is generated by the unmanned aerial vehicle flying the initial flight plan;

calculate an adjusted fuel consumption associated with the adjusted flight plan;

determine whether the adjusted fuel consumption is greater than an adjusted available energy, wherein the adjusted available energy comprises the existing charge of the rechargeable battery and the energy generated by the unmanned aerial vehicle flying the adjusted flight plan; and select the adjusted flight plan as the flight plan when the adjusted fuel consumption is not greater than the adjusted available energy.

9. The apparatus of claim 8, wherein the flight plan generator is present on the unmanned aerial vehicle.

10. The apparatus of claim 8 further comprising:

a communications system configured to transmit the flight plan to the unmanned aerial vehicle.

11. The apparatus of claim 8 further comprising:

a database containing aeronautical information for at least one of flight restricted areas or utility lines, wherein the flight plan generator is configured to create the adjusted flight plan while avoiding flight restricted areas.

12. The apparatus of claim 9 further comprising:

a database containing aeronautical information for at least one of flight restricted areas or utility lines, wherein the flight plan generator is configured to create the adjusted flight plan while avoiding flight restricted areas.

* * * * *